United States Patent
Wurtz

(10) Patent No.: US 8,320,591 B1
(45) Date of Patent: Nov. 27, 2012

(54) ANR HEADPHONES AND HEADSETS

(75) Inventor: Michael J. Wurtz, Lake Oswego, OR (US)

(73) Assignee: LightSPEED Aviation, Inc., Portland, OR (US)

( * ) Notice: Subject to any disclaimer, the term of this patent is extended or adjusted under 35 U.S.C. 154(b) by 1036 days.

(21) Appl. No.: 12/218,617

(22) Filed: Jul. 15, 2008

Related U.S. Application Data

(60) Provisional application No. 60/959,717, filed on Jul. 15, 2007.

(51) Int. Cl.
- H04R 5/033 (2006.01)
- H04M 11/08 (2006.01)
- H04R 5/00 (2006.01)
- H04M 3/00 (2006.01)

(52) U.S. Cl. .......... 381/309; 381/74; 381/370; 381/375; 381/71.6; 379/308; 379/90.01; 379/110.01; 455/575.1

(58) Field of Classification Search .................. 381/309, 381/311, 74, 123, 182, 370, 375, 372, 384, 381/119, 71.1, 71.6; 379/308, 90.01, 110.01, 379/430, 420.04, 422, 423; 455/575.2, 569.1, 455/575.1

See application file for complete search history.

(56) References Cited

U.S. PATENT DOCUMENTS

| | | | |
|---|---|---|---|
| 5,058,155 A * | 10/1991 | Larsen | 379/442 |
| 5,182,774 A * | 1/1993 | Bourk | 381/71.6 |
| 5,604,813 A * | 2/1997 | Evans et al. | 381/71.6 |
| 5,675,658 A * | 10/1997 | Brittain | 381/72 |
| 5,694,467 A * | 12/1997 | Young, III | 379/430 |
| 5,983,100 A * | 11/1999 | Johansson et al. | 455/426.1 |
| 6,091,812 A * | 7/2000 | Iglehart et al. | 379/308 |
| 6,278,786 B1 * | 8/2001 | McIntosh | 381/71.6 |
| 6,519,475 B1 * | 2/2003 | Kim | 455/557 |
| 6,625,287 B1 * | 9/2003 | Wurtz | 381/94.1 |
| 6,704,428 B1 * | 3/2004 | Wurtz | 381/370 |
| 6,735,316 B1 * | 5/2004 | Wurtz | 381/74 |
| 6,873,862 B2 * | 3/2005 | Reshefsky | 455/569.1 |
| 6,985,592 B1 * | 1/2006 | Ban et al. | 381/74 |
| 7,003,092 B1 * | 2/2006 | Lester et al. | 379/387.01 |
| 7,076,204 B2 * | 7/2006 | Richenstein et al. | 455/3.06 |
| 7,187,948 B2 * | 3/2007 | Alden | 455/557 |
| 7,215,766 B2 * | 5/2007 | Wurtz | 379/430 |
| 7,466,838 B1 * | 12/2008 | Moseley | 381/370 |
| 7,668,308 B1 * | 2/2010 | Wurtz | 379/430 |
| 7,920,903 B2 * | 4/2011 | Ueda et al. | 455/575.1 |
| 8,014,824 B2 * | 9/2011 | Alden | 455/557 |
| 8,041,052 B2 * | 10/2011 | Hopkins | 381/81 |
| 2003/0026440 A1 * | 2/2003 | Lazzeroni et al. | 381/86 |
| 2004/0136522 A1 * | 7/2004 | Wurtz | 379/430 |
| 2004/0185773 A1 * | 9/2004 | Gerber et al. | 455/3.06 |
| 2004/0258253 A1 * | 12/2004 | Wurtz | 381/71.6 |
| 2005/0130697 A1 * | 6/2005 | Dyer | 455/550.1 |
| 2005/0239434 A1 * | 10/2005 | Marlowe | 455/345 |
| 2005/0276421 A1 * | 12/2005 | Bergeron et al. | 381/71.6 |

(Continued)

*Primary Examiner* — Edgardo San Martin

(74) *Attorney, Agent, or Firm* — Brooks Kushman P.C.

(57) ABSTRACT

An innovative automatic-noise-reduction headset includes numerous enhancements. For example, one embodiment includes added noise-control circuitry at each of one or more auxiliary inputs to reduce audible hiss in the earcups. Another embodiment includes integrated crossfeed processing circuitry to enhance the spatial imaging of stereo audio perceived by headset users. Still another embodiment provides superior perception of noise cancellation by focusing noise cancelling at midband frequencies, such as 400-800 Hertz, as opposed to just lower frequencies. And another embodiment provides earcups formed of magnesium or a magnesium alloy for improved strength-weight as well as passive noise attenuation in the 400-800 Hertz range.

10 Claims, 28 Drawing Sheets

U.S. PATENT DOCUMENTS

| | | | |
|---|---|---|---|
| 2006/0013410 A1* | 1/2006 | Wurtz | 381/74 |
| 2006/0046656 A1* | 3/2006 | Yang | 455/41.3 |
| 2007/0225035 A1* | 9/2007 | Gauger et al. | 455/553.1 |
| 2008/0165981 A1* | 7/2008 | Wurtz | 381/71.6 |
| 2008/0167092 A1* | 7/2008 | Ueda et al. | 455/575.2 |
| 2011/0124381 A1* | 5/2011 | Wurtz | 455/570 |

* cited by examiner

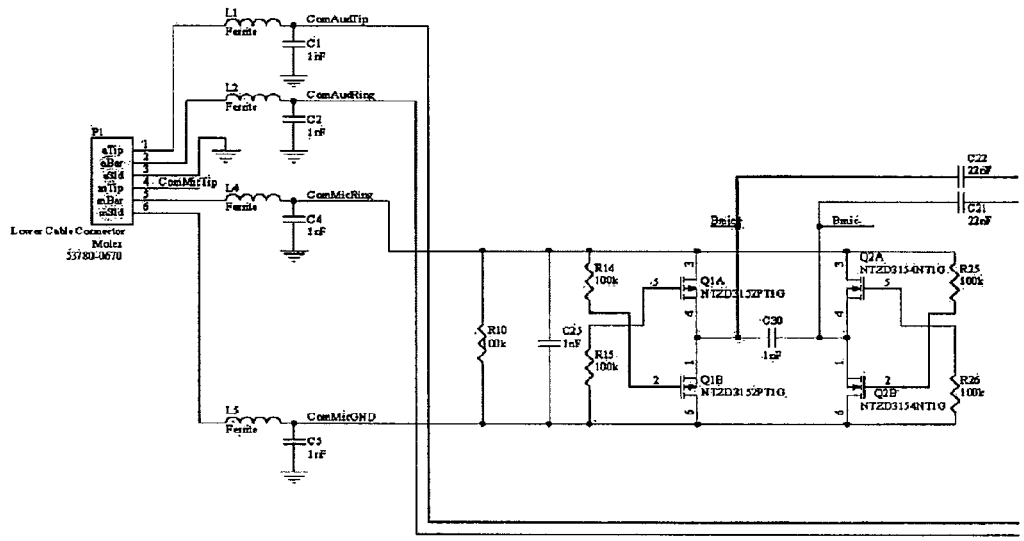
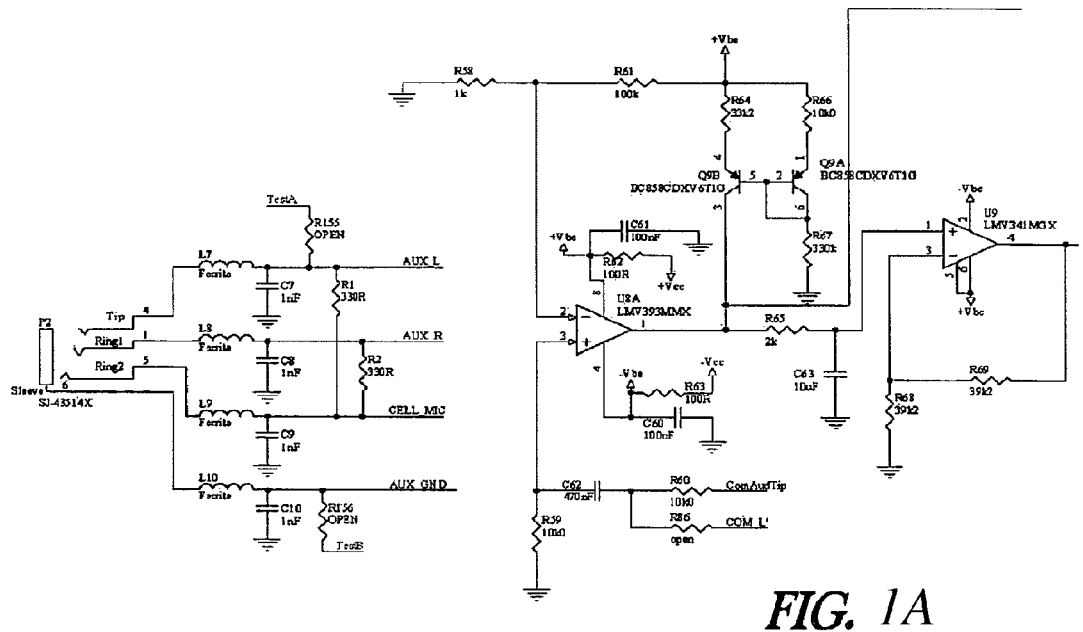
FIG. 1A

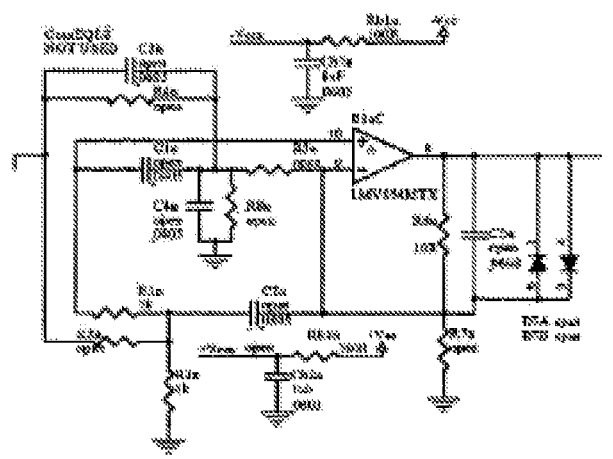
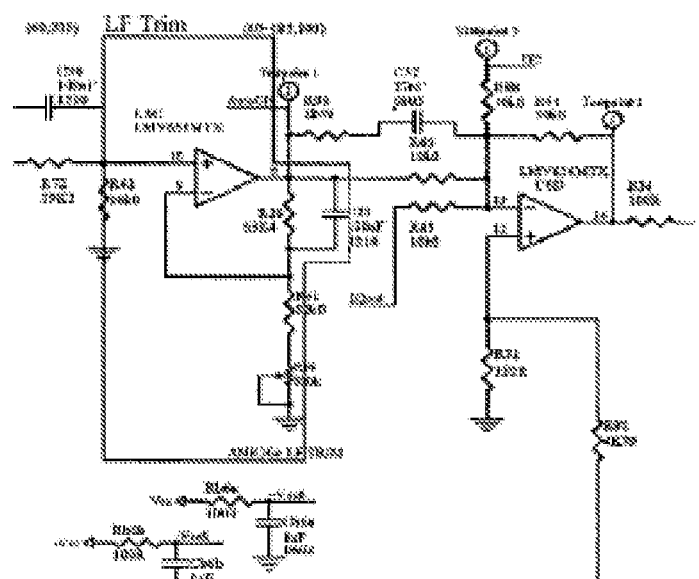
*FIG. 3B*

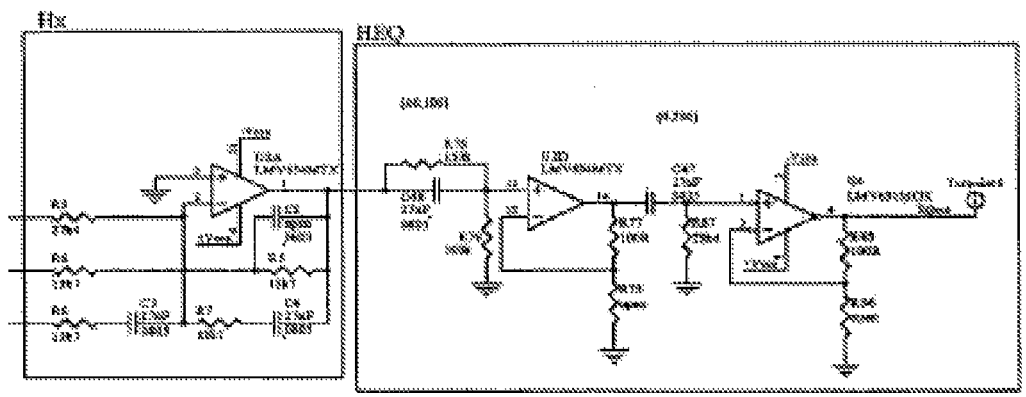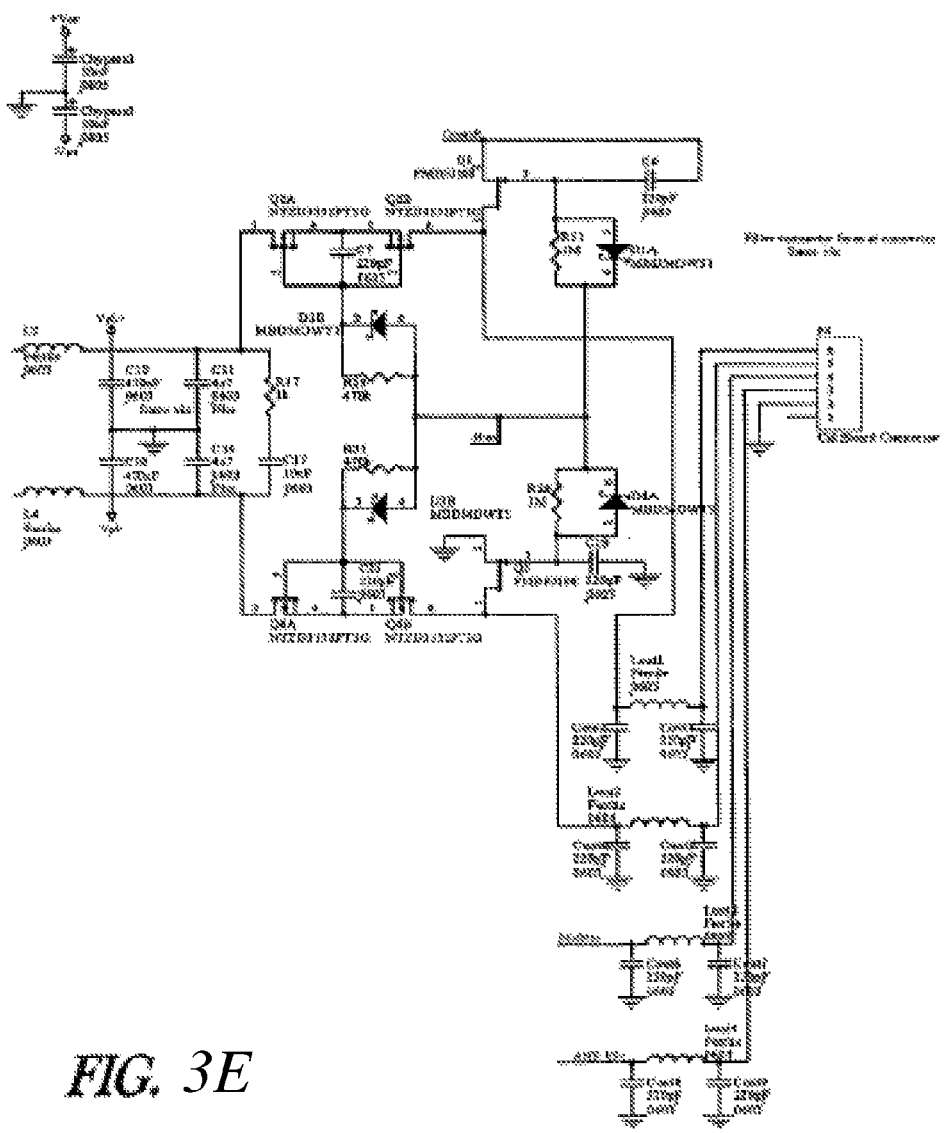
FIG. 3E $T_{DM} = T_D * T_M$ $T_M$ IS APPROXIMATED BY $\frac{k_1 - s}{s + 2\pi f_0}$ BELOW ~5kHZ $K_1$ VARIES BY ~ 2:1 → ± 3dS $f_0$ VARIES ~ 30 ~ 160HZ $H_1$ IS TUNABLE $H_1 = (s + 2\pi f_1) * k_2 * \frac{N_{(s)}}{D_{(s)}} = (s + 2\pi f_1) k_2 * H_1'$
$\qquad = H_{1p} * H_1'$ THUS IF TUNED SUCH THAT $f_1 = f_0$ E $k_1 * k_2 = c$ — CONSTANT THEN $T_{DM} H_1 = T_D * C * S * \frac{N_{(s)}}{D_{(s)}}$ $T_D$ IS THE ELECTROACOUSTIC RESPONSE OF THE SPEAKER WHICH IS REPEATABLE IN PRACTICE $f_1$ IS SET BY THE MICROPHONE BACK CAVITY LEAK WHICH VARIES BY $d^4$ WHERE
  d IS THE SMALLER DIMENSION OF THE VENT HOLE
  d IS ON THE ORDER OF 30 MICRONS

*FIG. 7*

FOR ANR FRC $$\frac{E(s)}{LEFT} = \frac{(HREQ1(s) \cdot HREQ2(s) \cdot H_{EQ} \cdot I_{LEFT} + HREQ1 \cdot HRX \cdot AP \cdot H_x \cdot H_{EQ} \cdot I_{RIGHT}) \cdot T_{DE} \cdot H_2}{1 - T_{DM} H_1 H_2}$$

$$= \frac{HREQ1 \cdot HEQ \cdot (HREQ2 \cdot I_L + HR_x \cdot H_x \cdot I_R) \cdot T_{DE} \cdot H2}{1 - T_{DM} H_1 H_2}$$

FIG. 9

$$\frac{E(s)}{LEFT} = \frac{(HREQ1(s) \cdot HREQ2(s) \cdot H_{EQ} \cdot I_{LEFT} + HREQ1 \cdot HRX \cdot AP \cdot H_x \cdot H_{EQ} \cdot I_{RIGHT}) \cdot T_{DE} \cdot H_2}{1 - T_{DM} H_1 H_2}$$

$$= \frac{HREQ1 \cdot HEQ \cdot (HREQ2 \cdot I_L + HR_x \cdot H_x \cdot I_R) \cdot T_{DE} \cdot H2}{1 - T_{DM} H_1 H_2}$$

FIG. 10

ANR HEADPHONES AND HEADSETS

RELATED APPLICATIONS

The present application claims priority to U.S. Provisional Application 60/959,717, which was filed on Jul. 15, 2007 and which is incorporated herein by reference. Additionally, the present application incorporates by reference U.S. Provisional Application (Ser. No. 61/135,044) which is entitled ANR Headphones and Headsets, which names Michael Jon Wurtz of Lake Oswego, Oregon as an inventor and which is filed on even date with the present application, namely Jul. 15, 2008.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2007, LightSPEED Aviation, Inc.

BRIEF DESCRIPTION OF DRAWINGS

BBMainRevD (FIG. 1) is an electrical schematic of a portion of a controller or battery box of an exemplary ANR headset or headphone and thus corresponds to one or more embodiments of the present invention. This circuitry may be incorporated into an earcup portion of a headset and/or into an intercom or other device coupled to the headset or headphone.

BBTopRevD (FIG. 2) is an electrical schematic of a portion of a controller or battery box of an exemplary ANR headset or headphone and thus corresponds to one or more embodiments of the present invention. This circuitry may be incorporated into an earcup portion of a headset and/or into an intercom or other device coupled to the headset or headphone.

Figure 1B:
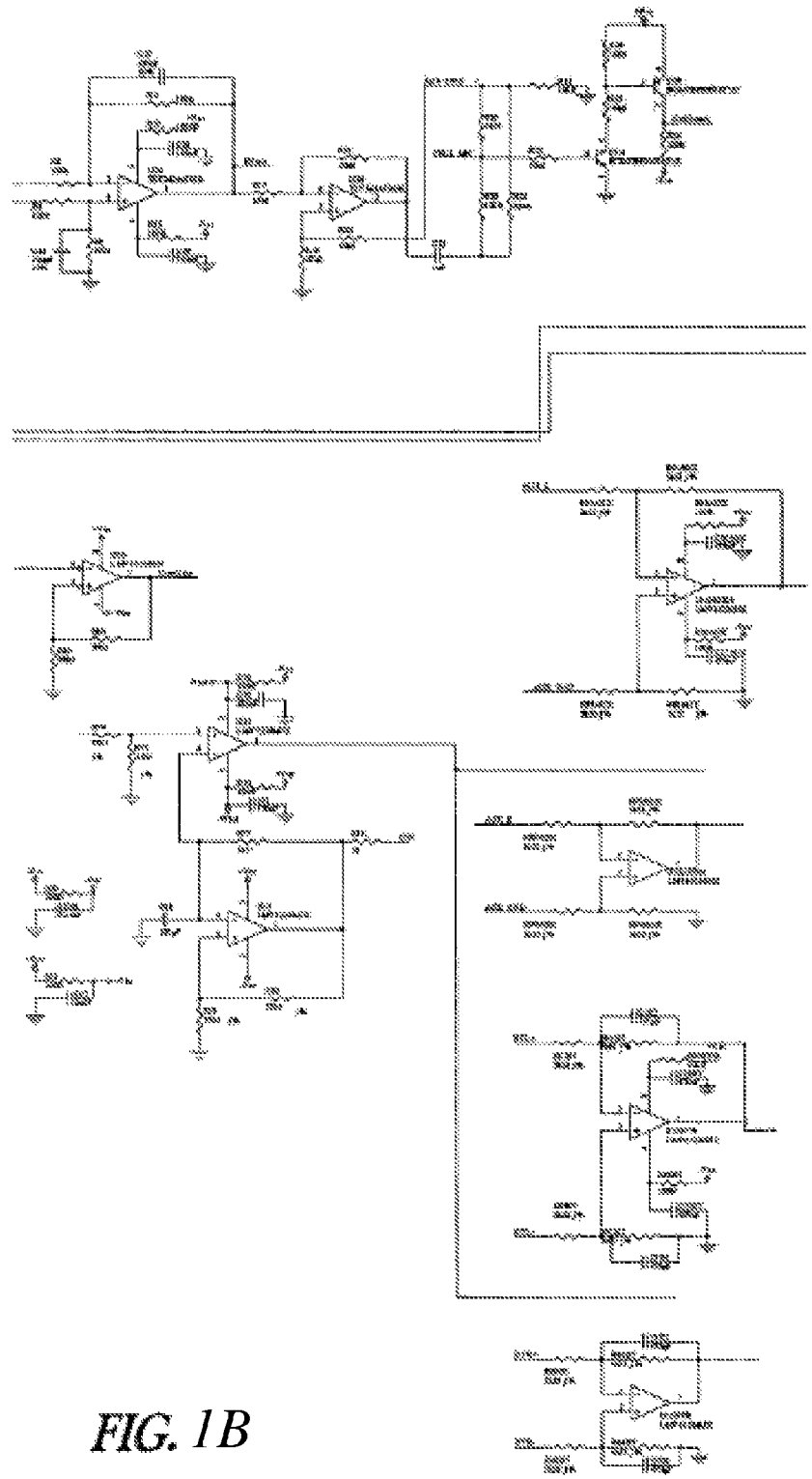
Figure 1C:
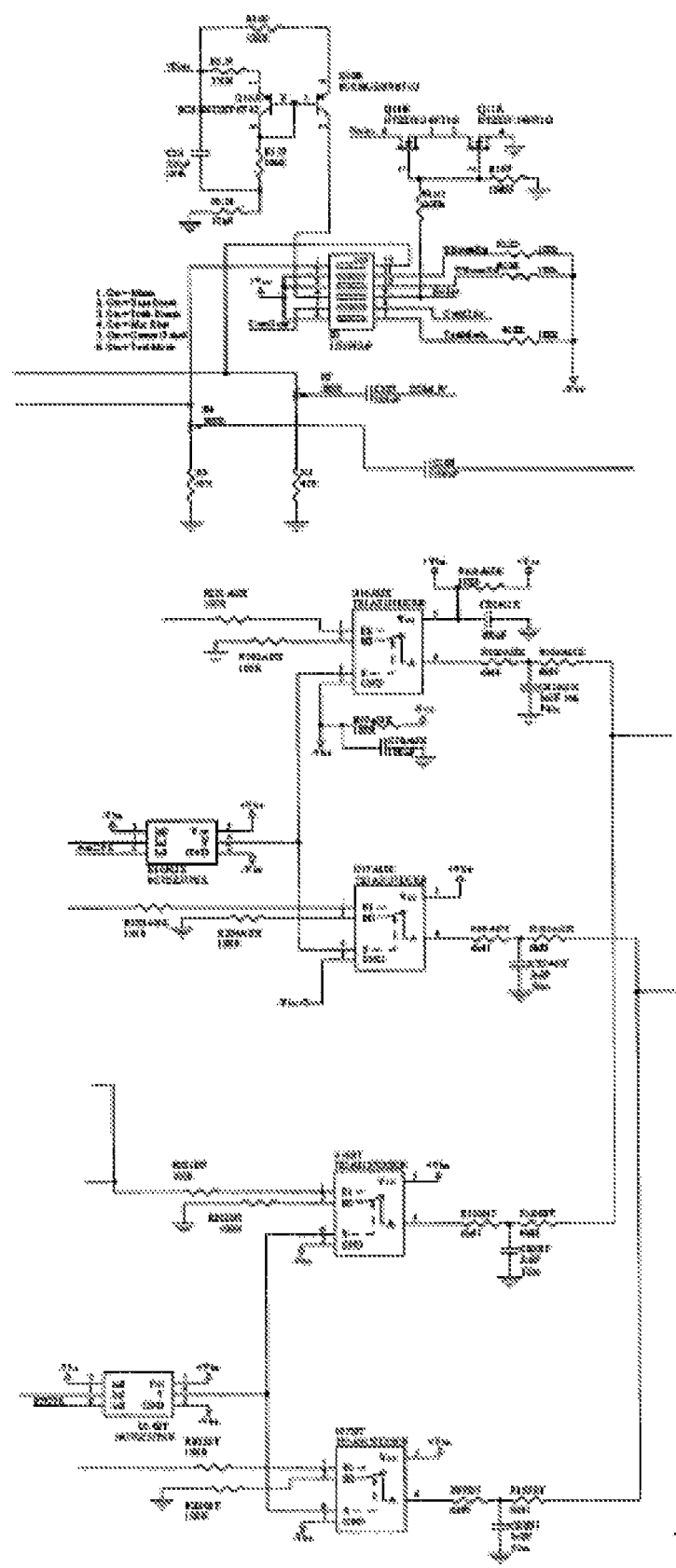
Figure 1D:
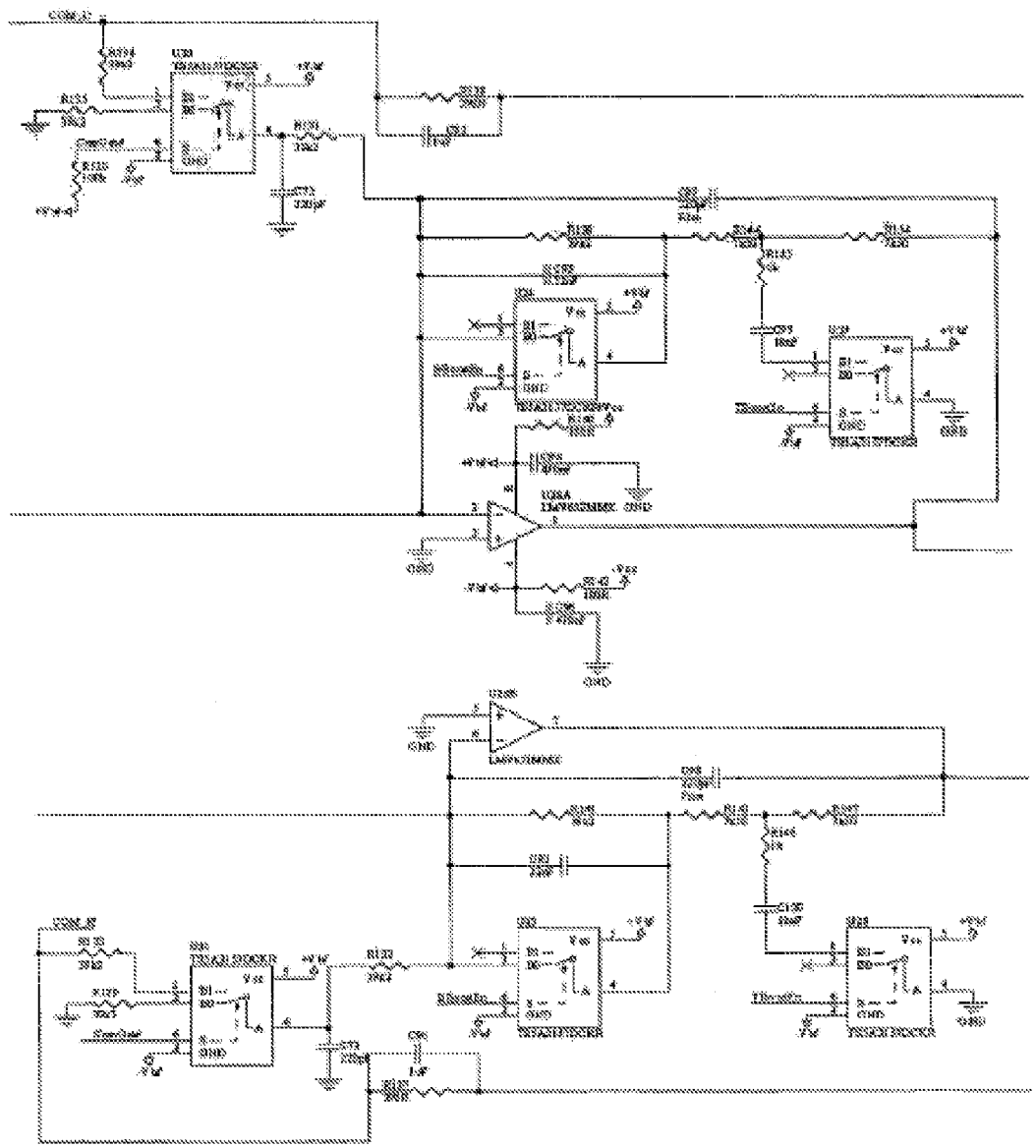
Figure 1E:
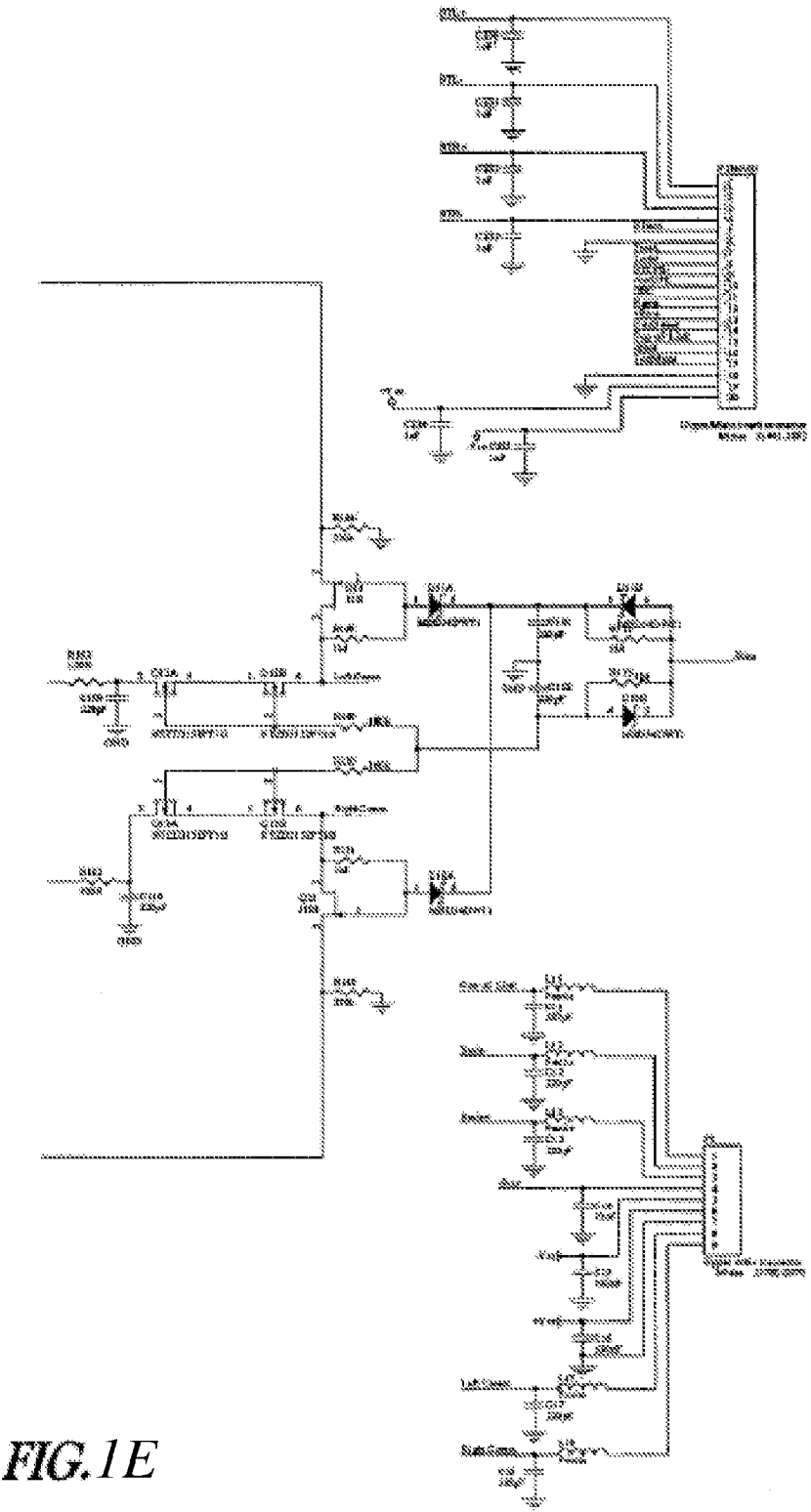
Figure 2A:
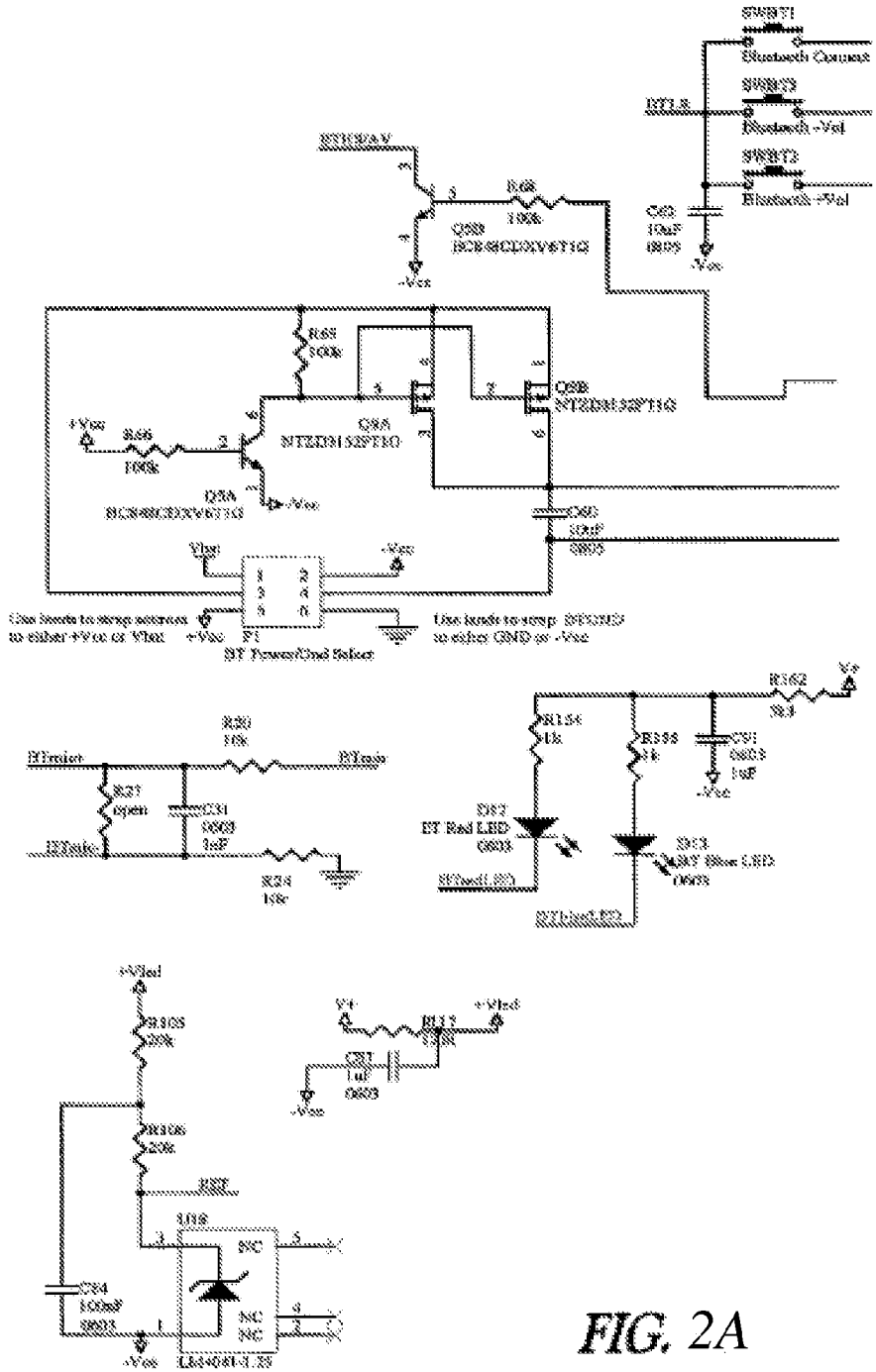
Figure 2B:
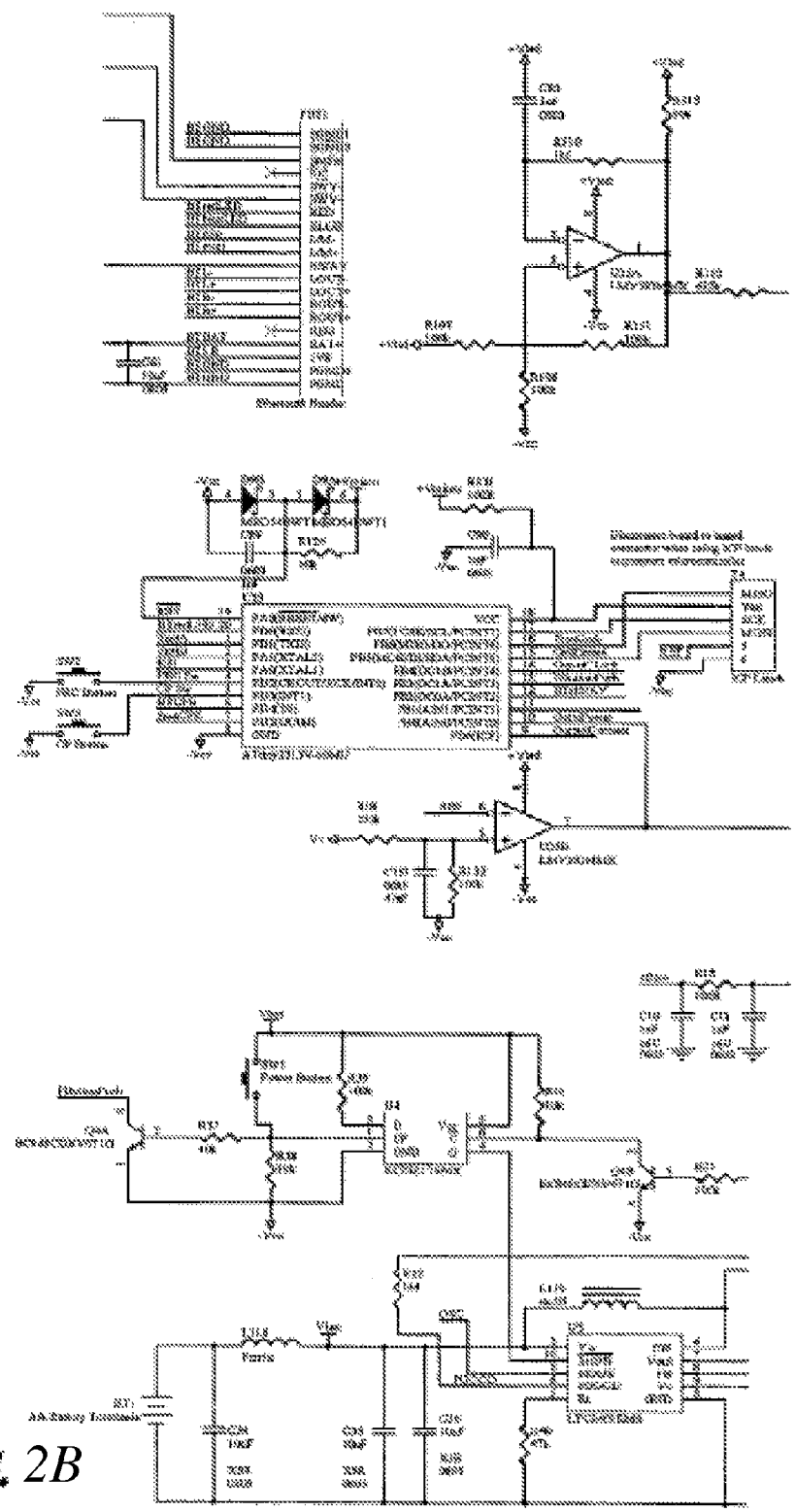
Figure 2C:
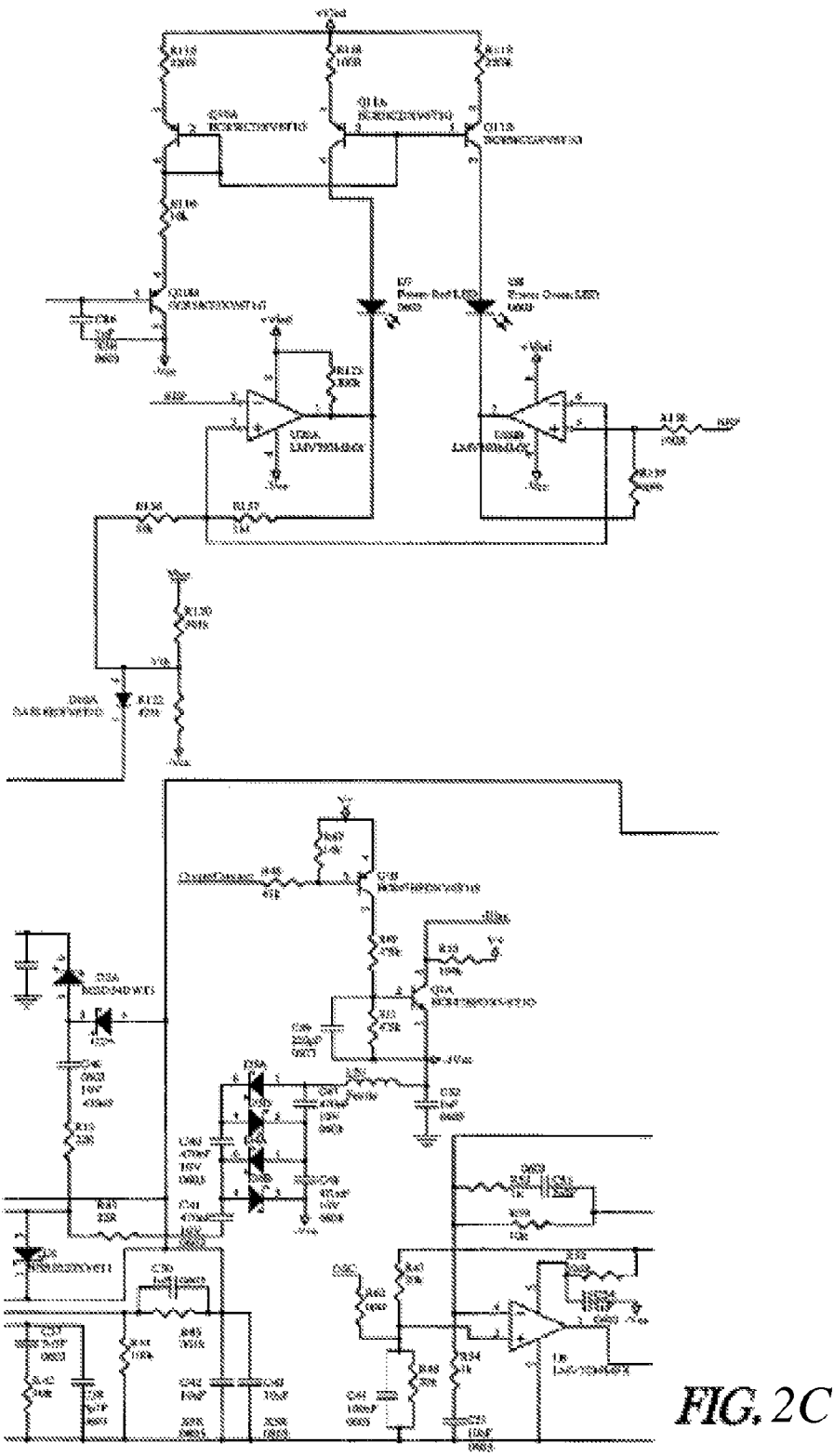
Figure 2D:
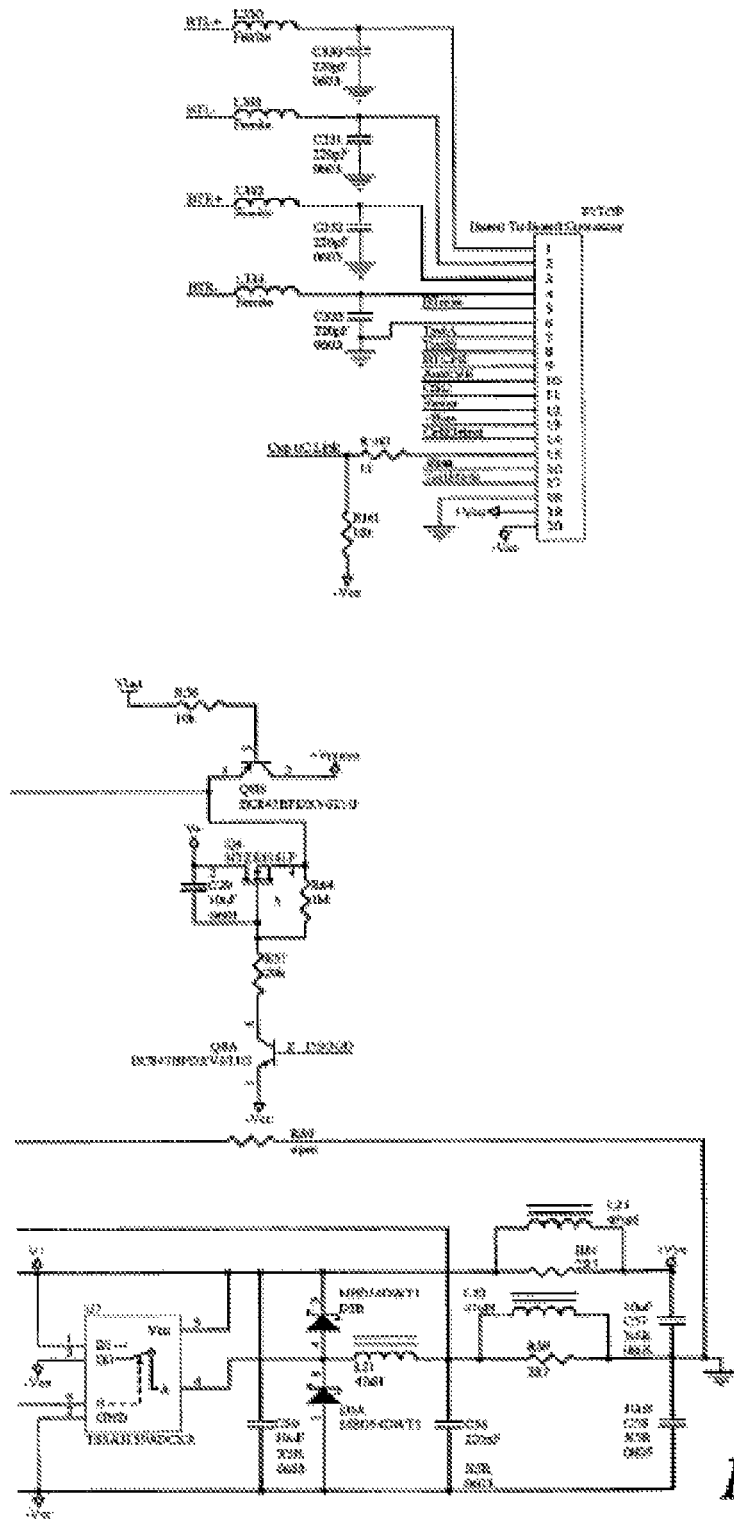
Figure 3A:
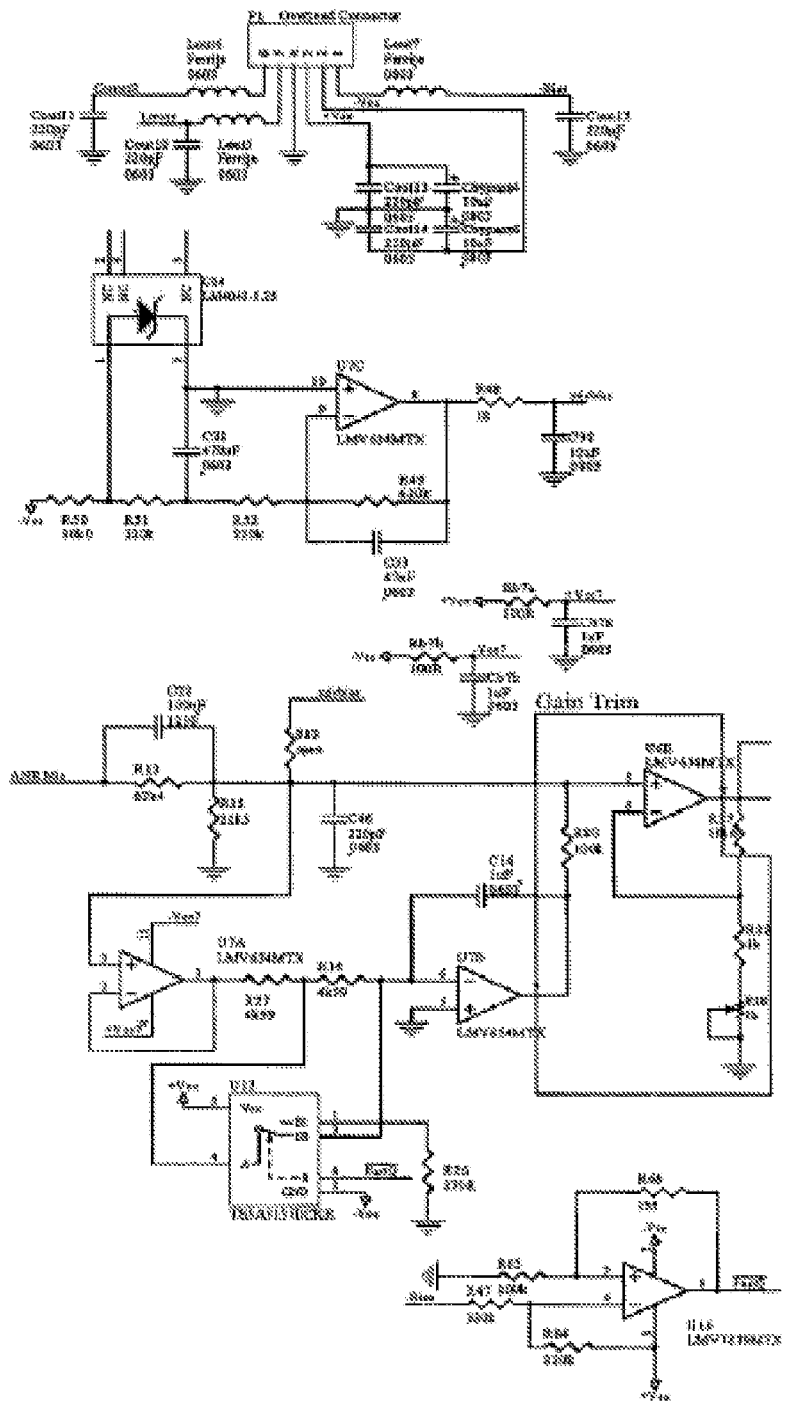
Figure 3C:
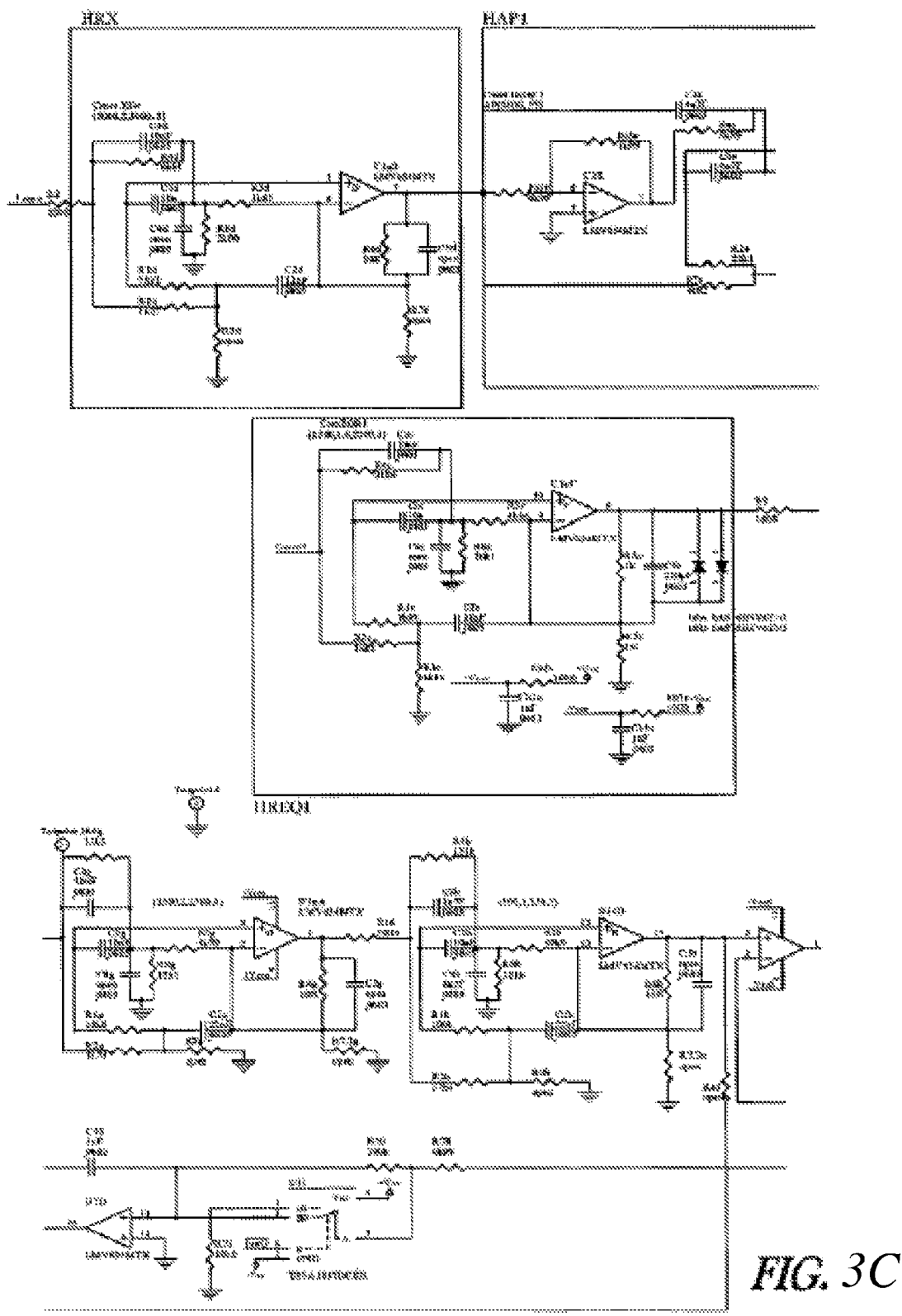
Figure 3D:
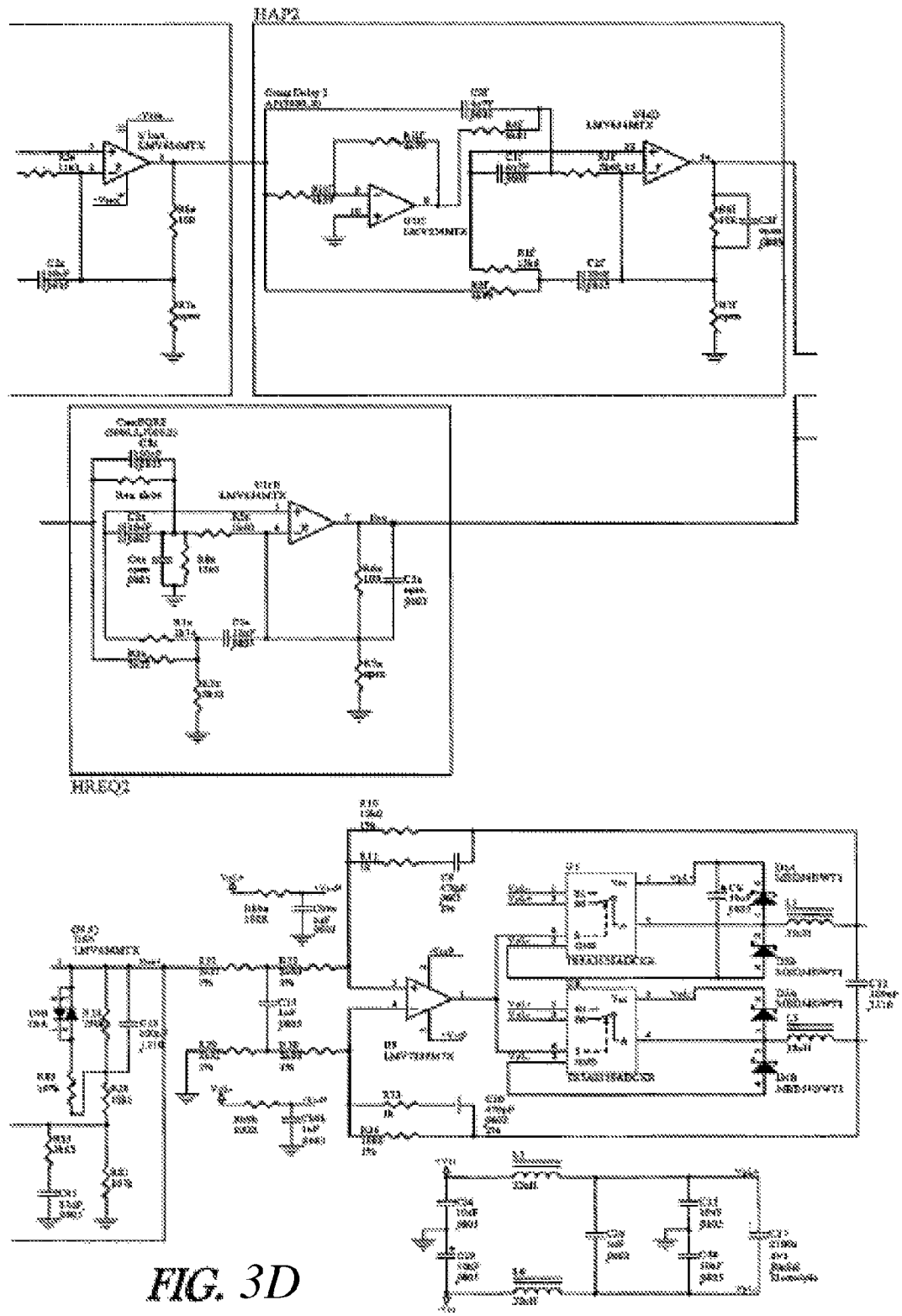
Figure 4A:
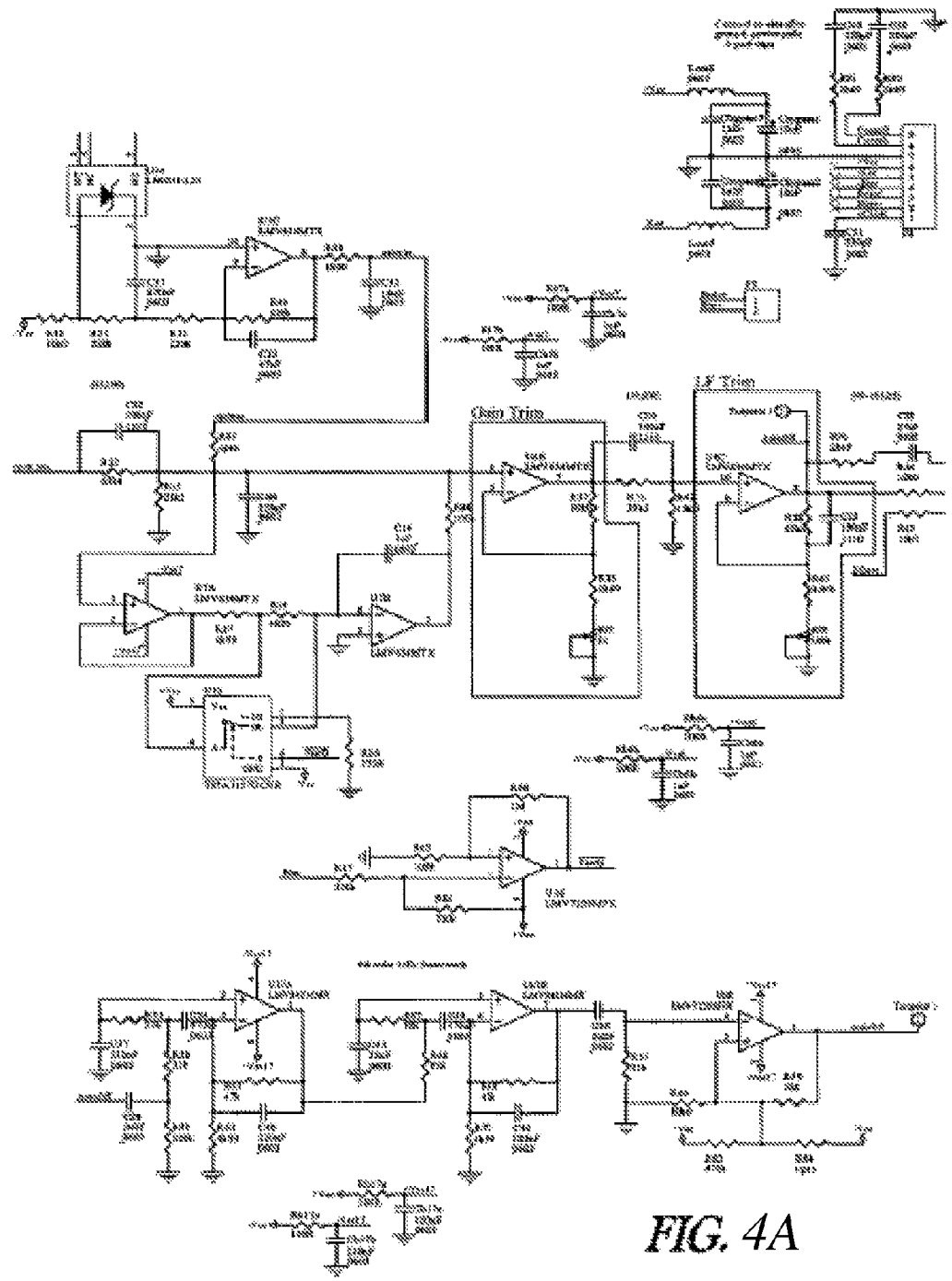
Figure 4B:
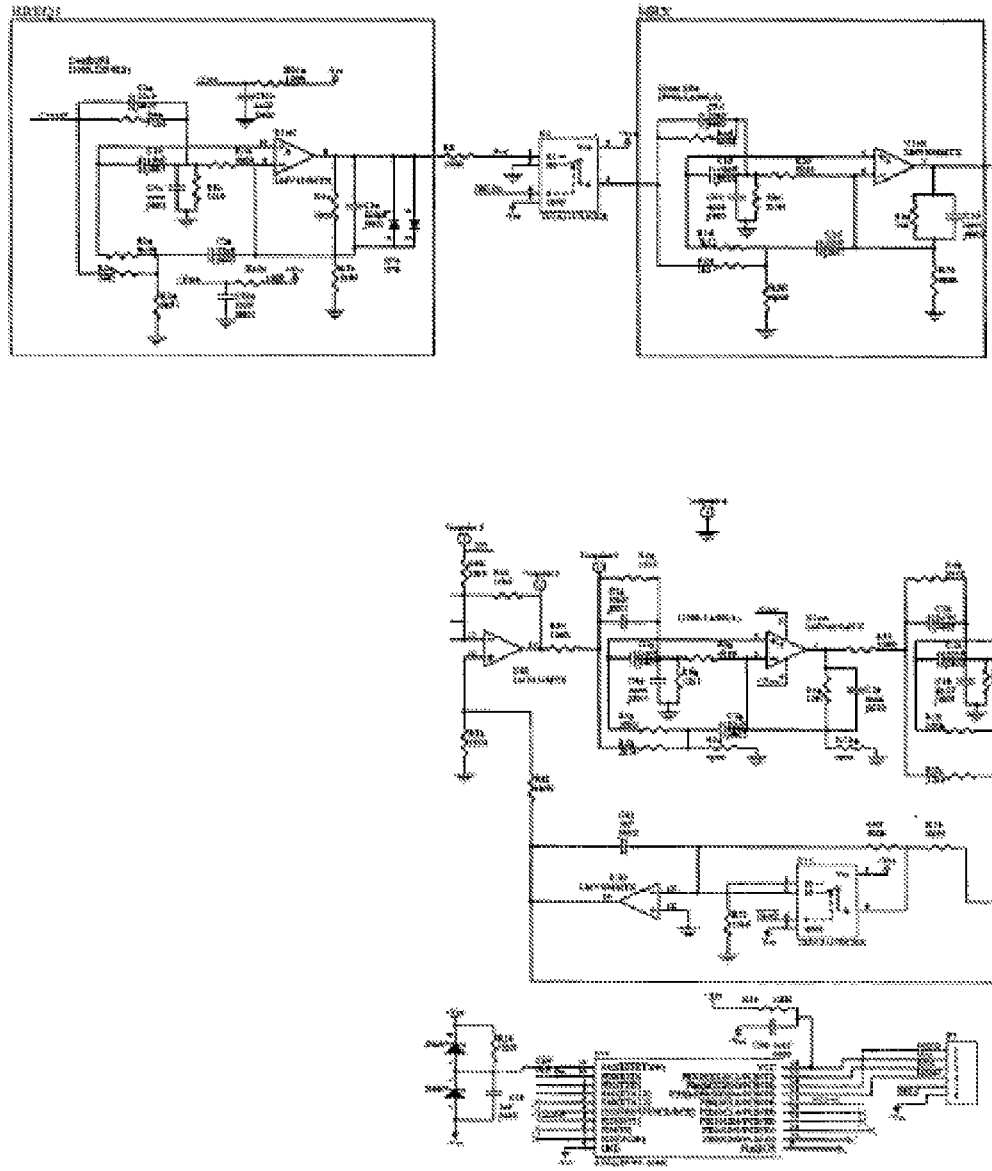
Figure 4C:
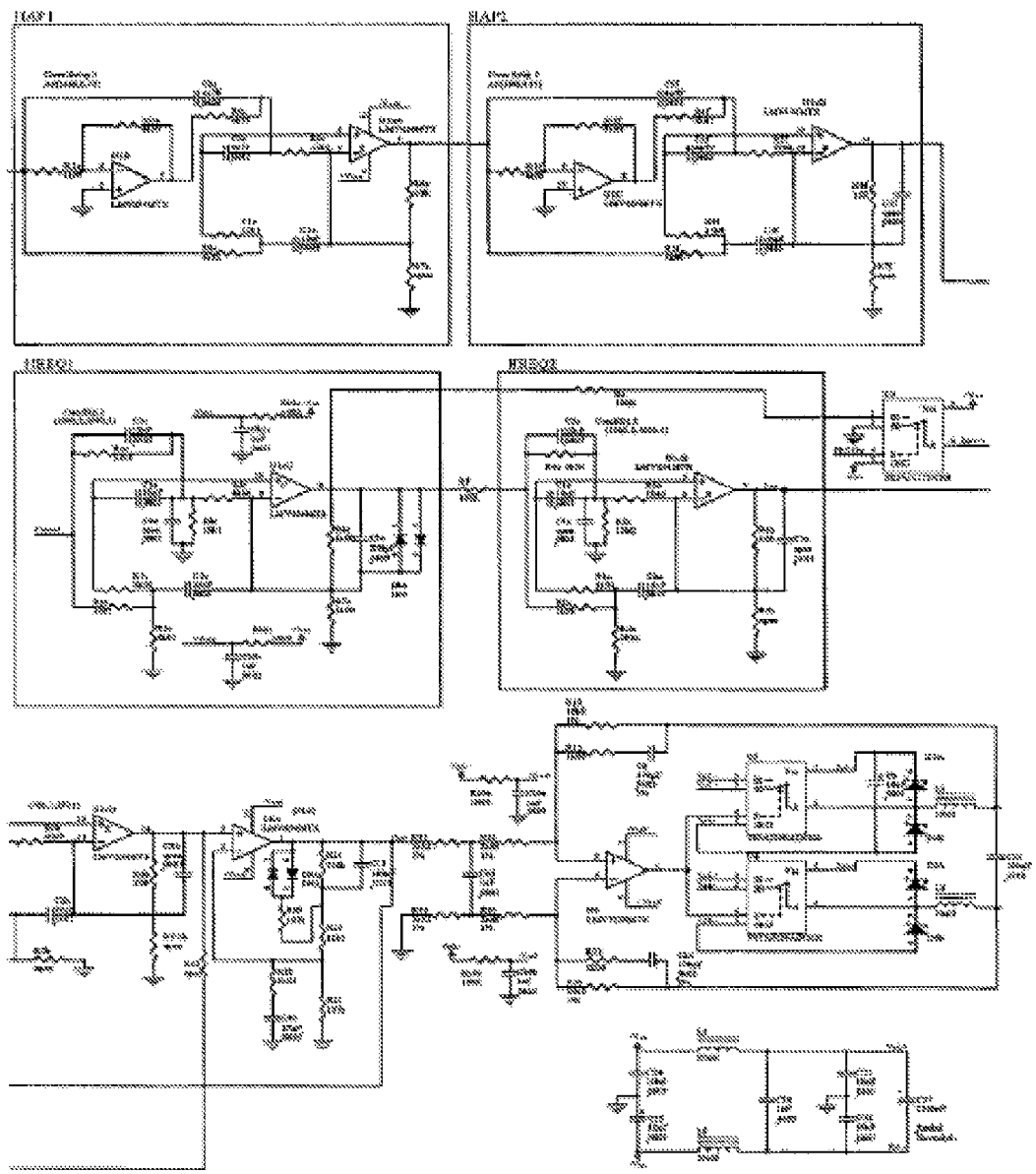
Figure 4D:
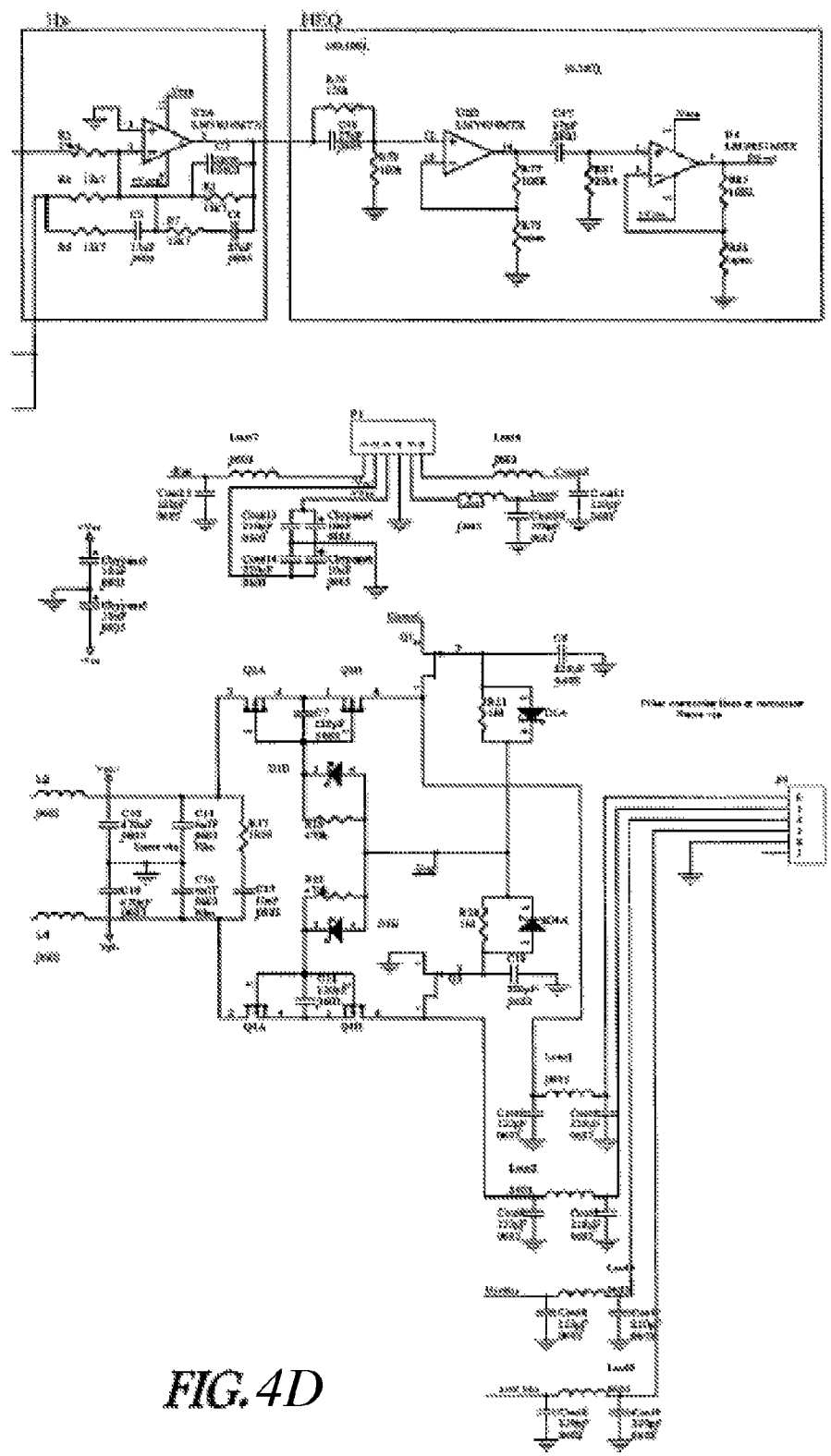

CupRightRevD (FIG. 3) is an electrical schematic of circuitry within a right earcup or earpiece of an exemplary ANR headset or headphone and thus corresponds to one or more embodiments of the present invention. This circuitry may be incorporated into the controller portion of a headset and/or into an intercom or other device coupled to the headset or headphone.

CupLeftRevD (FIG. 4) is an electrical schematic of circuitry within a left earcup or earpiece of an exemplary ANR headset or headphone and thus corresponds to one or more embodiments of the present invention. This circuitry may be incorporated into the controller portion of a headset and/or into an intercom or other device coupled to the headset or headphone.

Figure 5:
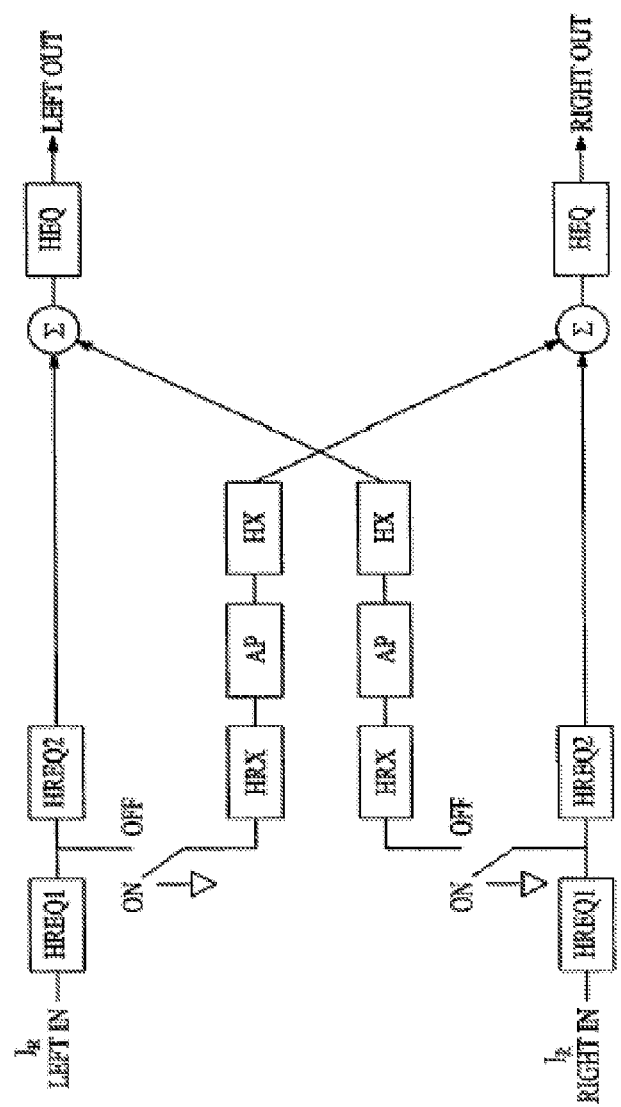

Com Filters RevD (FIG. 5) is a block diagram of exemplary integrated circuitry combining an ANR servo-control system for noise reduction and a channel crossfeed circuitry for enhanced spatial imaging of acoustic signals and thus corresponds to one or more embodiments of the present invention.

Figure 6:
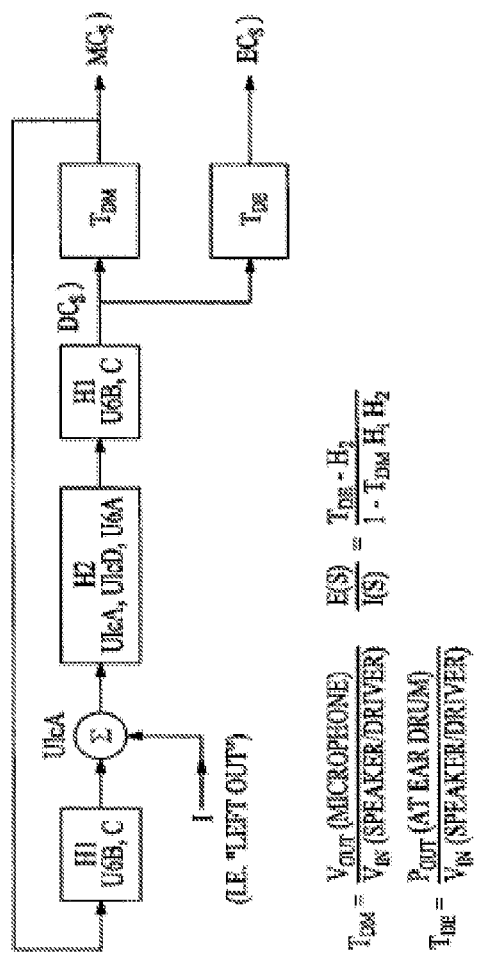

FIG. 6 is a block diagram representation of the circuitry in Figure E and thus corresponds to one or more embodiments of the present invention.

FIG. 7 is a mathematical derivation related to Figure F and thus corresponds to one or more embodiments of the present invention.

Figure 8:
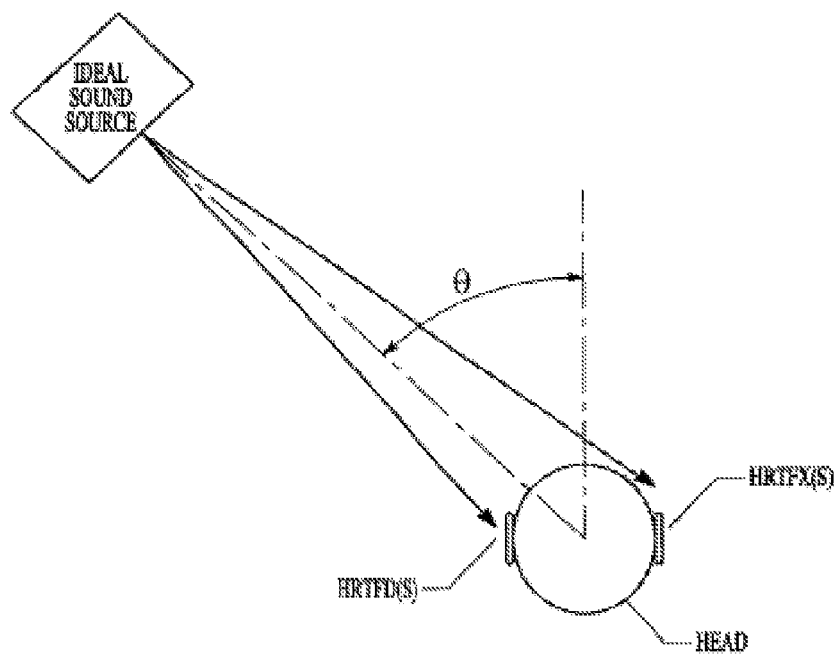

FIG. 8 is a graphical representation of operation of the circuitry of Figure E and thus corresponds to one or more embodiments of the present invention.

FIG. 9 is a continuation of the derivation from Figure G and thus corresponds to one or more embodiments of the present invention.

FIG. 10 is a continuation of the derivation from Figure G and thus corresponds to one or more embodiments of the present invention.

Figure 11:
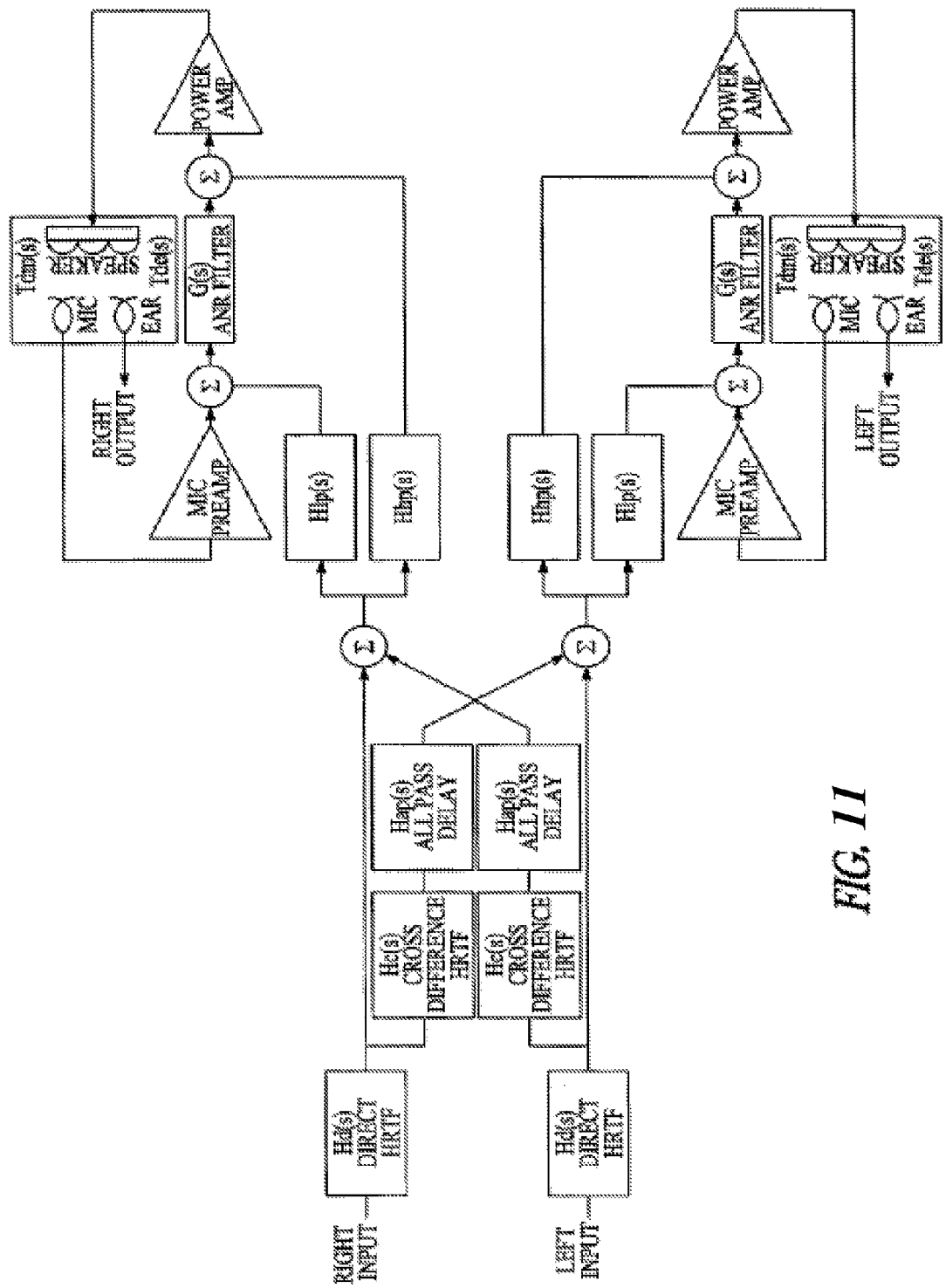

FIG. 11 is another block diagram of an exemplary integrated circuitry combining an ANR servo-control system for noise reduction and a channel crossfeed circuitry for enhanced spatial imaging of acoustic signals and thus corresponds to one or more embodiments of the present invention. Figure K may be viewed as a more generalized version of Figure E.

Figure 12:
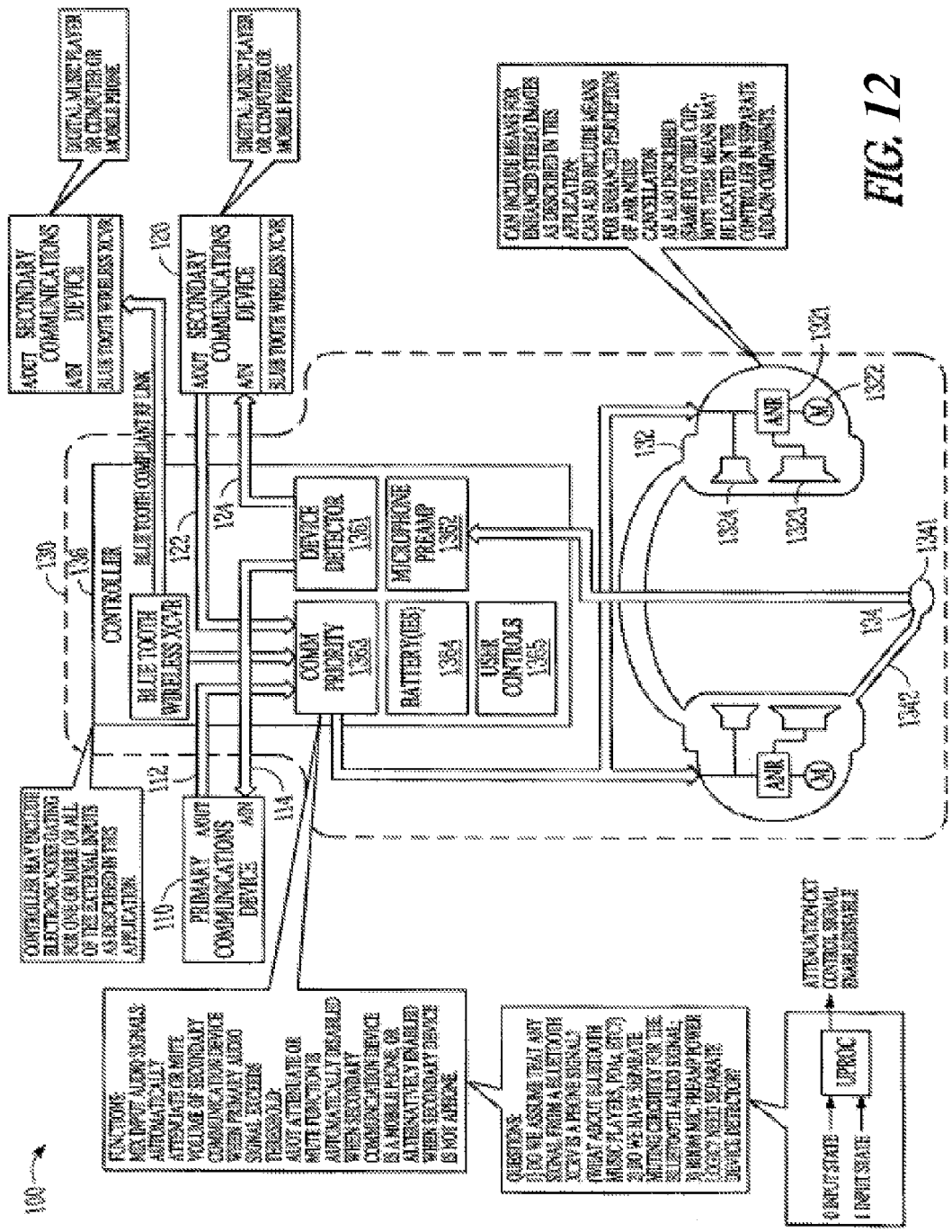

FIG. 12 is block diagram of an ANR headset system which incorporates circuitry described in the application and thus corresponds to one or more embodiments of the invention.

Figure 13:
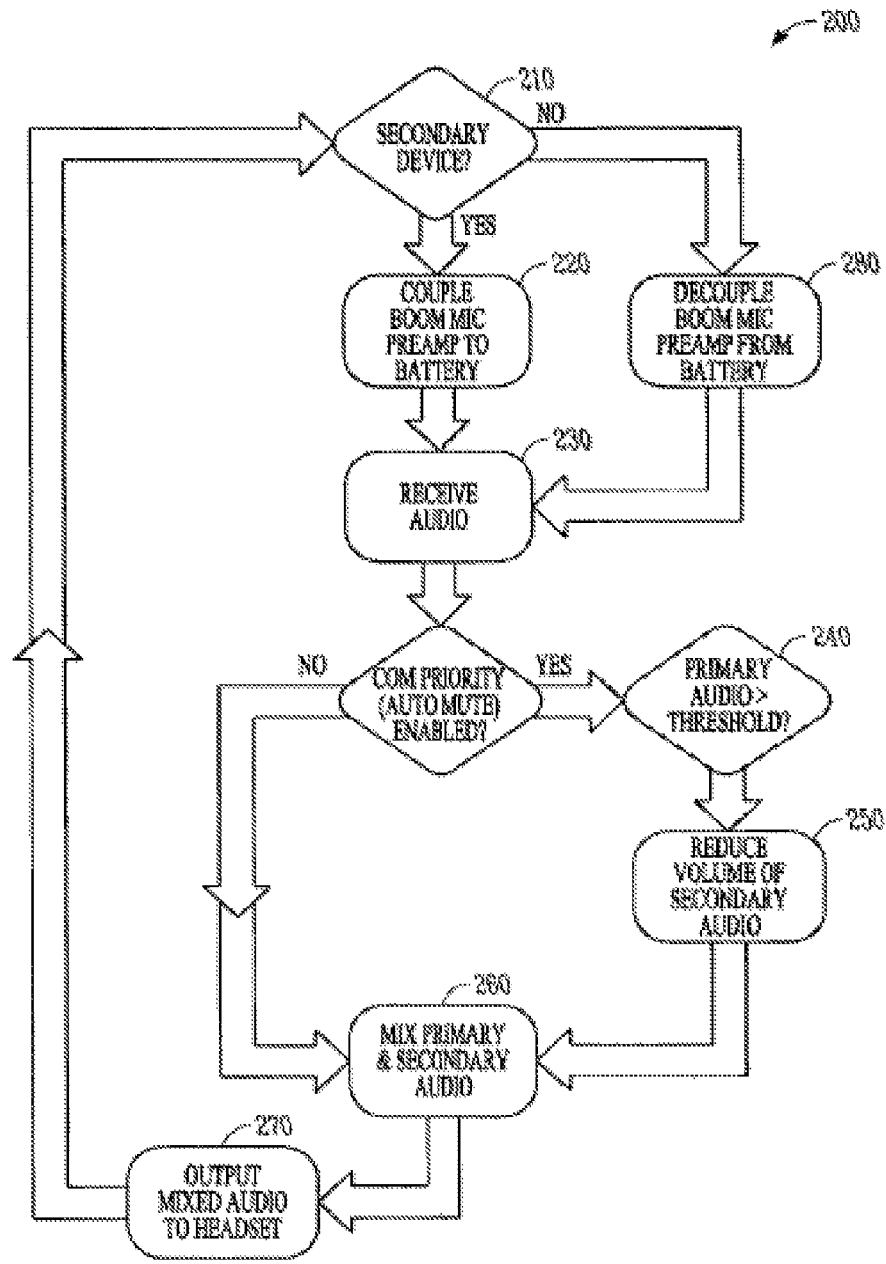

FIG. 13 is a flow chart of an exemplary method of operating at least a portion of the system shown in Figure L and thus corresponds to one or more embodiments of the invention. Figures L and M also describes unique communications priority logic that corresponds to one or more embodiments of the present invention.

Figure 14:
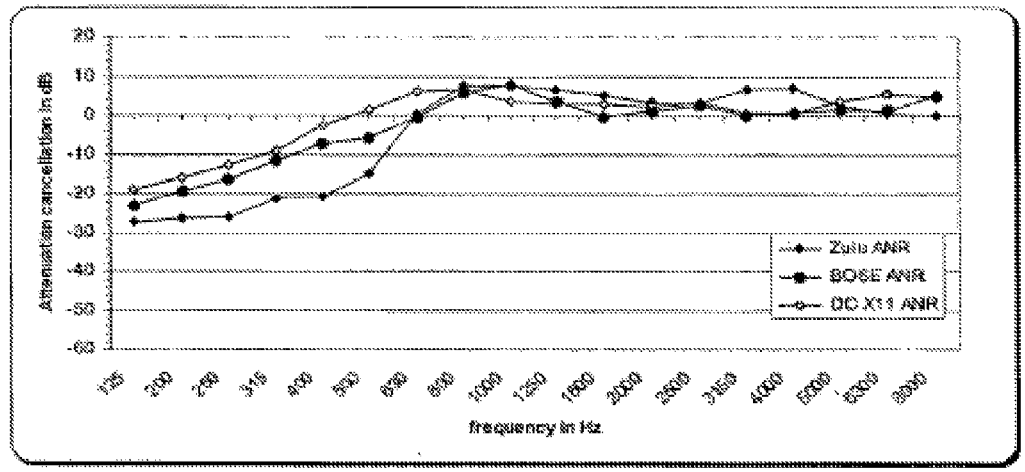
Figure 15:
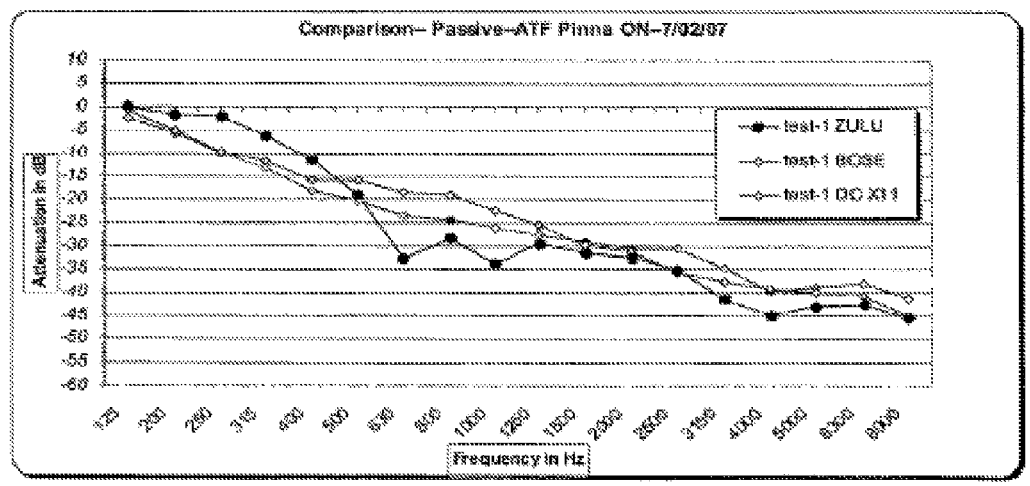
Figure 16:
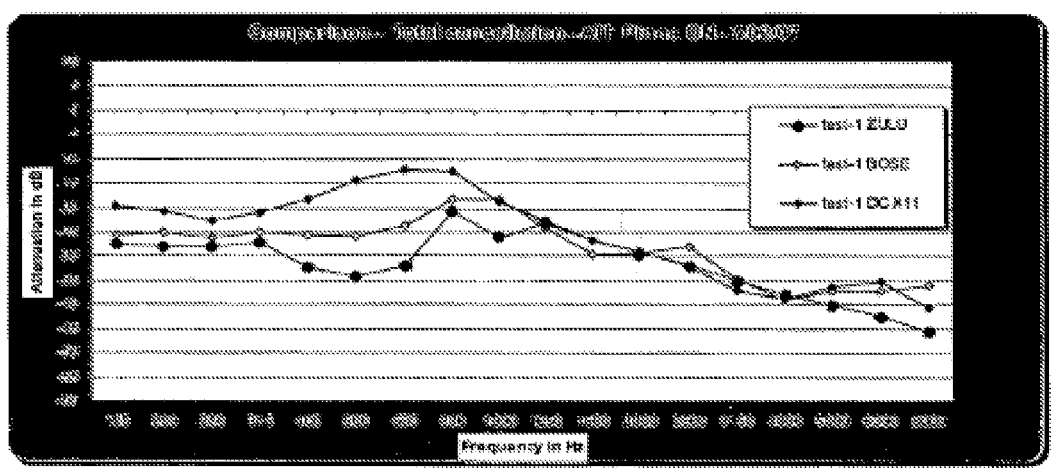

FIGS. 14, 15, and 16 are Cartesian graphs of ANR attenuation versus frequency, showing cancellation performance of an exemplary embodiment relative to two other conventional ANR headsets.

DETAILED DESCRIPTION OF EXEMPLARY EMBODIMENTS

This description, which incorporates the figures, claims, and referenced provisional applications, describes one or more specific embodiments of at least one invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Note that the features of various embodiments may be combined with features of other embodiments to yield other embodiments not expressly delineated as such.

Reducing Noise in Multi-Input ANR Headphones and Headsets

Most intercoms, including aircraft intercoms, have a squelch feature, which blocks any output signal unless it surpasses some threshold. That's all fine and good, and it is desirable, but they also have high levels of white noise.

In headphones or headsets, such as the 30L, or Zulu (exemplary embodiment) as we are now starting to call it, we use a premium low noise ANR mic and good electronic design to minimize white noise. However, when you hook it up to an intercomm, its excellent high frequency response, allows the white noise of the intercom to be heard as a very noticeable hiss.

What I did to circumvent this is added what I call a noise gate (which could be viewed as second wideband squelch circuit). Basically, I look at the intercomm signal with a comparator that goes low and stays low for some time period, for example 1 second, if the threshold is exceeded. I use the resultant "low signal" to connect the normally disconnected intercomm signal, thus allowing the comm signal into the headset signal path. If there is no comm signal, the intercomm is not in the signal path, and thus its noise is not in the signal path.

Unexpectedly, the lack of intercomm white noise contributes significantly to the perception of quiet even in the presence of much louder prop noise.

Typically, most aircraft intercoms are not very low noise. They inject lots of white noise into the headphones (or headsets). In a typical communications headset, this is perhaps noticeable but not generally problematic. However, in a high fidelity extended bandwidth headphone or headset such as in the exemplary embodiment described herein, the white noise is significant and clearly noticeable. To address this white noise problem and significantly increase the perceived quietness of the headset, the exemplary embodiment shown herein, effectively disconnects or decouples the headset's input comm signal path from the aircraft (vehicle) intercom when no communications are present.

As shown in the Battery Box Main Circuit Schematic Rev D (BBMainRevD), the exemplary embodiment accomplishes this using an electronic noise gating circuit that includes U30 and U31, which switch out the COM R' and COM L' signals. When a signal from the left corn is above a threshold set by R58 and R61 is detected, comparator U8A pulls low, discharging capacitor C63. This triggers U8B to go high, which results in U30 and U31 being connected to the Left and Right comm channels. There is also a defeat of this circuit on position 5 of dip switch S3, which causes U30/U31 to always connect the comm to the summing amplifier U26A/B. (In some embodiments, the defeat switch may be a push button or toggle on the battery box (or headset controller) or otherwise implemented in the firmware of the headset.)

Note that C107 and C108 should be assumed as shorts for your understanding. There is a minor error in the schematic. They were intended to be in series only with R133 and R134 respectively.

Some embodiments include this added noise gating feature for all the audio inputs to the headphones or headset. In fact, this may ultimately be the best solution, because for example, even an ipod digital music player is quite noisy when paused, but on, and thus injects significant noise into the headphones or headset. A Bluetooth wireless input, as also described herein, can similarly add unwanted noise into headphone or headset that was not previously problematic, but is so in higher fidelity headphones and headsets such as the exemplary embodiment.

Automatic Defeat of Comm Priority Logic in Headset or Headphone with BlueTooth Wireless Aux Input In BBMainRevD, U8A compares the aircraft incoming audio to a threshold. If the threshold is broken, it pulls low, and discharges C63. C63 is slowly recharged by the current source made by Q9A/B. This makes a linear ramp, vs the exponetially decaying one in the '766 patent referenced above. The voltage of C63 is input the non-inverting gain block made by U9. The gain is 2, thus it remains saturated to the negative supply (its a rail to rail output op amp) until the voltage across C63 is approximately 1.25V (−1.25 re gnd), then proceeds to linearly increase with time until it reaches 3.75V (+1.25 re gnd).

The output of U9 is attenuated by a factor of 0.5 by divider R74/R75 and connected to the non-inverting input into push pull comparator U11. The inverting input is connected to Capacitor C68 with is the reactive element of a oscillator. The comparator oscillator circuit of U12 switches states when the hysteresis of R82/R76 is overcome by the voltage across C68. Thus the voltage on C68 approximates a triangle wave (its slopes are slightly exponential) with a peak to peak amplitude that can be approximated by the power supply voltage +Vbc* (R76/(R76+R82)) and −Vbc* .... Since +Vbc~=−Vbc the peak ramp voltage is +/−1.354V. This means the duty cycle of U11 varies by approximately 1.25/1.354 to (1−1.25/1.354) or ~92%~8%, thus providing an un-attenuated to attenuated level of 8%/92% or 21 dB. The range can be adjusted by varying the ratio of R74-R75 and R76-R82, but 20 dB is approximately the desired output and going to more extreme duty cycles can cause issue related to comparator propagation times vs overdrive ... the result being noise and distortion.

The output of U11 is the PWM which U14Aux (for the wired secondary input) and U14BT for the BT input. Pin 6 of U14's high or PWM depending on the state of pin 6, which is uP controlled by either the comm priority toggle button (CP toggle TopRevD) or the mic bias, or the BTHS/AV input generated from the BT module, which are indicative of the mode of those inputs. (i.e. two way communications, or music one way.)

The output of U14Aux/BT is then connected to the control pin of U16BT/AUX and U17BT/AUX which are 2:1 muxes. The input into U16's B1 is modulated by the S input binary signal which switches between B1 and B0, thus producing a modulated output. Since the PWM signal duty cycle varies slowly, the result after low pass filtering (the networks like R100Aux, C83Aux) is roughly the input signal into B1 multiplied by the duty cycle of the PWM.

The PWM frequency is roughly 700 kHz. Further filtering is provided by the summing amplifier U26's feedback capacitor C97/C98. The net result is a very low distortion, high fidelity comm priority mute.

A side note: All aux inputs are differential. For the BT (Bluetooth) inputs, this is mandatory since the outputs are differential, and have high common mode noise. For the Aux input, the feature is somewhat novel in that our aux input gets used not only with battery powered sources, but with auxiliary aviation equipment that is plane powered, and often the power wiring has not been down with great care in this equipment. The result is significant "ground loops", caused by the auxiliary aviation equipments gnd potential differing from the aviation radio/intercomms ground potential. The result without a diff amp varies from annoying to unusable, being very dependant on the wiring of the radio/intercomm and the auxiliary device. The use of the diff amp for the wired input significantly reduces common mode noise caused by ground loops. The aux input gnd is tied to comm gnd via a 100R resistor R32 (BBMAINRevD). The 100R resistor limits the ground loop current since the appliance wiring of the radio and auxiliary device are much lower resistance (for example <1 ohm.)

The use of the diff amp (see the topology of the circuit around U15AUX for example) has minimal negative affect (slightly higher noise) for floating or battery powered sources. The common mode rejection of this implementation, assuming low impedance sources, is typically better than 40 dB. This is sufficient to make a marginally usable system usable, and a slightly noisy system quiet.

Please note, in this embodiment (Zulu), unlike the embodiment in U.S. Pat. No. 7,215,766 (which is incorporated herein by reference), the mic bias is always present. However, in some variations of the BBMain, the process flow in the 766 patent is implemented.

See also Figures L & M.

Exemplary Method for Enhanced Stereo Imaging in ANR and Non-ANR Headphones and Headsets FIGS. 1, 2 (as well as Figure xx) [Figs. E, F, K] shows a block diagram for a novel implementation for a headphone for general use (or a headset) that employs:

1) means for suppressing acoustic noise by an electro acoustic means and
2) means to both improve the music listening experience and reduce fatigue associated with listing to source material intended to be played on loudspeakers.

The first part of the circuit is referred to as the cross feed processor. In headphone listening, the isolation of the right (left) channel information to the left (right) ear produces a very different listening experience. When music is mixed, the product is optimized for speaker listening. When a person listens to music over a stereo set of speakers for example, a sound only in the right speaker is heard first by the right ear, then some time later by the left ear. In addition to a propagation related delay, there are also pinna, head, and torso affects that perturb the response of the acoustic wave.

One major problem with conventional outboard (auralization) processors (i.e. processors outside of the headphones) is that they must make some gross assumption about the response of the headphones being plugged into it. This leads either to assuming they are flat, or just ignoring the pinna-related effects since the type of headphone will dramatically affect this. To overcome this, the exemplary embodiment integrates the crossfeed into a headphone and thus provides the great benefit of being able to at least use a better estimate of a realistic HRTF Another major problem is that most all headphones exhibit huge differences in at least the low frequency response based on fit, even on the same user. It's very possible to have differences of 10 dB or more based on fit in the low frequencies. (See, for example, U.S. patent application Ser. No. 10/201,540, which was filed on Jul. 22, 2002, and which is incorporated herein by reference.

Active noise reduction headphones are fairly popular now and the art is well understood. Ones of the closed loop type, shown in FIG. 1,2 and xx, utilizes closed loop control methods to reduce low frequency noise. Besides the benefit of reducing external noises which improves the signal-to-noise ratio, the control method also reduces the variation due to fit by the amount of loop gain "G" according to 1/(1–G), where G a complex function of frequency. Thus, in the exemplary embodiment, the cross-feed circuitry is combined with a closed-loop active noise reduction system.

This is extremely beneficial in that in non-headphone listening experiences our ears are very use to having the low frequency amplitudes be approximately equal due to the relatively long wavelength relative to our ear spacing. A significant amplitude difference between right and left ears can significantly destroy any effort at creating a convincing stereo image similar to what can be attained using loudspeakers.

Crossfeed circuits that go along way to reducing fatigue associated with headphone listening can be quite simple if they only deal with the intensity crossfeed.

Any crossfeed method will be enhanced by a known headphone response and reduced variation in fit accomplished by integration of the crossfeed processor with an ANR headphone due to the reduced variation in the low frequency response associated with closed loop active noise reduction headphones that are properly optimized.

A practical realization of the block diagrams in FIGS. 1 and 2 (above) is incorporated in the CupLeftRevD and CupRightRevD circuit schematics, that follow: (Note that these are taken in conjunction with the BBTop and BBMain schematics and the block diagram in the '766 patent to realize a complete ANR Headset (or headphone) with numerous features. Moreover, further headsets and headphones can be realized through incorporation of features shown in U.S. Pat. No. 6,704,428 which is incorporated herein by reference.

In the CupRightRevD and CupLeftRevD circuits, note labels and boxes in RED to facilitate this description. Note that at the far left about center height, there is a label "ANR Mic". That is the connection to the ANR mic. At the far right, P4, pins 5 & 6 is the power amp output connecting to the ANR speaker. The circuitry directly between those points is the ANR filter.

If a headphone were ideal, the response would be that of the Head Response Transfer Function (HRTF). Most good stand alone headphones attempt to have a frequency response that approximates some HRTF from some direction. The HRTF is what we hear at our eardrum when sound comes at us from a point in space. HRTF is a function of the direction of the source, i.e. f(theta, phi) for example. The HRTF is different for all angles of incidence to our ears, because our pinna, head and shoulders affect incoming sound waves.

In the exemplary embodiment HRTF mimics a source of sound coming from approximately ear level, +/−36 degrees off axis, with on axis being in front of our nose, or 0 degrees.

Since an ANR headset, or "servo headset" is designed for optimal servo bandwidth, such a system will rarely have an ideal HRTF frequency response, nor even very close to ideal for that matter.

The functions of blocks HREQ1 and HREQ2 are to equalize the ANR headset to have a net response that approximates the idealized HRTF for +36 degrees. The function of blocks HRX and HX is to provide a net response to the "crossfeed ear" that approximates the −36 degree sound source. (Note: HX is a summer for the direct signal with no frequency response change, i.e. the input Z and the feedback Z are the same. It is a summer and low pass shelf function for the cross signal. The shelf provides most of the shadow effect of our head to sounds coming from the other side.)

Blocks HAP1 and HAP2 provide delays corresponding to the travel time delay difference for a source at 36 degrees. That is the difference in time it takes to get to the left ear after it hits the right ear. These blocks are "all pass" networks of the 4th order bessel poles. Bessel filters correspond to a low pass filter though, and here they are implemented as an all pass.

This provides twice the delay over a 4th order bessel low pass, because of the right half plane zeros corresponding the left half plane bessel poles. The reason for this is that our brain for the most part uses "delay" information only to some point, around 2k~2.5 kHz, then switches over to HRTF amplitude information. It is thought that this is because the phase information becomes ambiguous when there is more than one wavelength in the distance traveled between right and left.

A further advantage of the All pass over the bessel (which is used in some embodiments) is that the delay rolls off, while the amplitude doesn't in the all pass. Thus the summing of the cross signal has little affect on mono signals. A pure delay, say from a digital delay, causes what is referred to as a comb filter effect. This is because at some frequency, the delay corresponds to a 180 degree phase shift, and the sum for a mono signal is zero. The net effect of this is a mono response that has ever closer notches as the frequency increases.

It is important to note that there are delays from these all pass elements, which are more or less flat to about 3 kHz, and there are delays associated with the group delay of the all the HRTF for +/−36 signals. These are different though, in that for any minimum phase system, changing the amplitude vs frequency will always have a known calculable phase or group delay effect. Almost, if not all natural filtering affects are minimum phase. To say this another way, there is group delay, or travel time delay, and there is HRTF associated delay resulting simply from the result of a change is amplitude.

The goal is to mimic both of these in the synthesized cross feed signal. The HRTF associated delays happen automatically if you get the correct amplitude response. The travel time delays in an ideal world would be perfectly flat across all frequencies, but again, this causes comb filtering affects with mono signals, something that two speakers equally spaced in front of the listener also do. The All pass filter mitigates by rolling off the delay such that the delay is never 180 degrees different across the audible range.

HEQ compensates for microphone and pre-injection point filtering in the ANR filter. i.e. the filtering effects of the microphone and filter elements prior to U6D summing amplifier.

A gain trim and low frequency trim are used for optimal matching of the net servo'd acoustic response to the ear. Driver frequency response in this implementation is assumed to be repeatable unit to unit, which is a good assumption, but microphone sensitivity is compensated for by the "Gain Trim" and the microphone low frequency pole, which is quite variable, is compensated for by the LF trim.

The resultant system has a net response due to an audio input that is substantially uniform or at least more uniform in the 40~400 Hz range than non-servo'd headphones. This results in very good low frequency matching which in turn results in an improved stereo image for headphone listening.

The 40~400 Hz range is significant because it is generally difficult in natural (non-headphone) listening to ever have that range be very different in amplitude ear to ear because of the long wavelengths in this frequency range. If the amplitudes are not very close to identical in both ears, our brains know its not right. Above these frequencies, amplitude and phase start to become important because there is now a significant difference in phase between a right and left sound source. Amplitude difference is also very important for up, down and behind information. i.e. a source at +/−36 degrees has approximately the same delay difference as one +/−36 degrees behind us.

At frequencies around 2~3 kHz the phase information starts to not be used for directional information because of the phase ambiguity associated with having a travel distance greater than 360 degrees. At higher frequencies our directional cues are mostly amplitude differences associated with the pinna and head effects.

Note that in the right cup schematic, U1aC HFEQ1 is not used, as that processing is done to the left signal by U1cC HFEQ1 and fed over to the right cup via P1, the overhead cable connection (in the bridge between the earcups).

Also, note that the output of HEQ is EQout, which is injected into the ANR loop at U6D.

Further benefit can be realized through this integration by optimizing the HRTF to account for the known baseline response of the ANR system This can also be accomplished in general with a simplification of the circuitry. For example, rather than using a filter in the crossfeed processor to realize a HRTF and an equalization filter to correct for ANR headphone response anomalies (such as correcting for boosting at the high frequency loop gain boundary (as done in some embodiments), the HRTF and equalization filter can be integrated, and thus simplified.

The typical HRTF, according to Borwick, has an approximate 10 dB rise in the 2~3 khz range. This rise can be troublesome in real implementations of ANR headphones and headsets when the signal is injected before the ANR filters as in some embodiments. Injection before the ANR filters is desirable because it prevents the incoming signal from being attenuated by the loop gain, as would be the case if injected, for example at the power amplifier or by another speaker in the cup. However, injection before the ANR filter is also problematic because the ANR filter is typically bandpass in nature, for example rolling off below 100 Hz and above several hundred hertz. The attenuation at 1 kHz might be 20 dB for an ANR system designed to cancel 20 dB. Thus, the HRTF requires about 10-15 dB of boosting at 2~3 kHz, and the ANR filter is at least attenuated by 26 dB at this frequency. This causes a severe dynamic range problem, or background noise depending on how its dealt with. The object of crossfeed in an ANR headphone is higher fidelity sound; thus any ANR implementation that included HRTF and that exhibited increased background noise or low dynamic range would not be acceptable.

Thus, in the exemplary embodiment, a novel way of realizing the HRTF in a ANR headphone is to split the crossfeed signal into a low pass and high pass version, and then inject the low-frequency portion in the traditional place, that is, before the majority of the ANR filters, and the high-frequency portion at the end of the ANR filters, before the power amplifier (or even at the summing junction of the power amplifier.) Estimates are that this split cross-feed technique can account for approximately 30 dB of improved signal to noise ratio.

An exemplary block diagram of the integrated crossfeed ANR headphone (headset) is shown below in Figure K.

Note that the all-pass delay is different than a bessel lowpass derived delay as follows because the all-pass delay never attenuates the high frequencies. That is |Hap|=1 for all frequencies. Its delay is frequency dependent, but my all pass produces a delay of about 250 uS from DC to about 2.5 khz. The Hc filter, or amplitude correction produces additional delay at low frequencies which happens as a result of the mono-nature of bass, and also the shadowing effect "differences" between direct and shadowed ears.

In contrast, the bessel low pass approach by nature of being minimum phase. (i.e. the phase response is related to the amplitude response) cannot produce a delay without changing the amplitude.

The nature of the HRTF is that there is a true delay (related to the speed of sound and travel time) and one due simply to how the head and pinna's "filter" the sound, minimum phase.

From a purest standpoint a pure delay is ideal, but it causes a comb filter affect at high frequencies. Using an all pass solves this problem in that the amplitude is constant vs frequency, but the delay goes away at high frequencies in a manner that the amplitude modulation from summing is never severely out of phase when the amplitudes of summed signals are similar.

In some embodiments, the direct HTRFs, the Cross-Difference HTRFs, the All-pass delays and the summers and the power amps are provided as separate standalone component for use with any headphone or headset. That is, one that uses an all pass for the delay and a correction filter Hd or a difference compensation from direct to cross.

The prior cross-feed architecture is similar to that shown in Figure XX, except that the feed forward filter in to the far left summers is not used, and the summing node into the ANR loop is somewhere between the two shown, and I take the cross signal from about half of the direct HRTF EQ (the middle if you will). This is because about half the HRTF is more or less duplicated in the Cross HRTF amplitude portion.

The implemented circuitry (in CupRightRevD and CupLeftRevD):

The following system is used to describe biquads (i.e. the ratio of two $2^{nd}$-order polynomials that describe a filter block: (fn, Qn, fp, Qp), Which means its a numerator polynomial is $s^2+s*2*pi*fn/Qn+(2*pi*fn)^2$, and its denominator polynomila is the same but with subscript "p"'s instead of subscript "n"'s.

The direct HRTF is (1 kHz, 3, 1.7 kHz, 2)*(5 k, 10, 7 k, 2)

The cross is taken from the output of the (1 k, 3, 1.7 k, 2) filter, then just 4th order All passed with bessel poles and right half plane mirror'd zeros.

For the cross feed, these are summed and put through an additional low pass shelf that has a pole at 333 Hz and a zero at 1 k.

The HREQ1*HREQ2*HEQ purpose is to result in a frequency response to the ear drum that corresponds to a target direct HRTF.

Potential changes to the circuitry include changing the order of the filters, such as the HRTF cross filters to determine the biggest perceived impact. The brain may be more "turned on" by envelope delay or by amplitude at the >3 k range. The order of the filters has to do more with dynamic range and clipping issues.

Another embodiment basically makes the cross signal only modified by a low pass shelf Hx of fz=1 kHz, fp=333. The rationale for this is driven by the above, envelope delay vs cross HRTF issue and also a more pragmatic one, which is if the (5 k, 10, 7 k, 2) is placed in front of the (1 k, 3, 1.7 k, 2) then when the filters clip, the clipping will be at 7 kHz range, and if implemented correctly will produce just odd order harmonics at ~21 k, 35 k . . . , which are out of the audible range.

Presently, if the 1.7 k, 2 poles are in the first filter HREQ1, then it is prone to clipping at odd order harmonics of ~1.7 k, and get modified by the 7 k, 2 filter, which is not desirable.

The re-order implies that:
HREQ1=(5 k, 10, 7 k, 2)
HREQ2=(1 k, 3, 1.7 k, 2)
(Thus the direct HRTFEQ is unchanged)
HRx=(1 k, 3~5, 1.7 k, 1~2)
(initially, i'll keep it the same, as recent listening showed if I bypassed Hx the illusion was better)

What this implies is the cross signal will only be amplitude different by potential differences I decide to design into Hx (the ~) and the low pass shelf fp=333, fz=1 k. It will also be delayed by HAP1 and HAP2, which promises much better dynamic range.

In general, HREQ1, HREQ2, HRx, Hx, and Heq can take on any desirable forms, not just biquads.

One thing not intuitive is the filter function Hx acts only on the cross signal and passes the direct signal flat. Thus, the direct signal sees
Hdirect=HREQ1*HREQ2*HEQ before injection into the loop and the cross signal sees:

$$Hcross = HREQ1*HRX*HAP1*HAP2*HX*HEQ$$

Generally, there is a HRTF direct and a HRTF cross and then there's the choice of how its injected into the ANR loop. It can be early in the loop, or late.

For the ANR loop diagram lets say from the mic it has the following:

$$H1 > H2 > speaker$$

H1 being the filter prior to the summing node U6D.
H2 being any filter action after the summing node U6D.
Hde being the driver response to the ear.
Hdm being the driver response to the anr microphone.
E is the output of Hde
M is the output of Hdm
'i' being the input to the summing node between H1 and H2 for comm injection (EQout on the schematic REVD)

The resulting transfer function is E/i (the response at the ear drum to an input to the ANR loop is:

$$E/i = (Tde*H2)/(1 - Tdm*H1*H2)$$

So the Ear response, a pressure (Tde has units Pressure/volts) is:

direct: $Hdirect*Tde*H2/(1 - Tdm*H1*H2)$

Cross $Hcross*Tde*$

Another interesting feature is the GainTrim, LFTRIM block, which allows for highly accurate, if not perfect, compensation of the sensitivity & low frequency response of the mic. Thus, TDM*H1 is trimmed to be the same for any mic response variations via pole zero cancellation. This means the response at the ear is only a function of the driver response, which can be highly repeatable.

The ANR implementation shown herein also takes advantage of a body of audiological data related to the concept called "preceived loudness". Which refers to a concept where a given amount of attenuation in a certain range is 'perceived' as adding a greater level of quieting than the same amount of attenuation (dB reduction) in another portion of the frequency range. In other words, the exemplary implementation embodies the notion that attenuation at 100 Hz is less important in terms of perceived quietness than attenuation at 400-800 Hz. More precisely, the exemplary embodiment ensures that attenuation at 400-800 Hz is significantly better than that found in conventional ANR headphones and headsets, while also improving attenuation at the lower frequency, even though this improvement in this lower band only marginally affects perceived quietness. To this end, the exemplary embodiment uses headcups consisting essentially of magnesium or a magnesium alloy.

Figures N, O, and P are Cartesian graphs of ANR attenuation versus frequency. The graphs show cancellation performance of the exemplary embodiment (Zulu) relative to two other conventional ANR headsets.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. An ANR headset system for coupling to output of an aircraft radio intercom, the headset comprising:
    ANR circuitry that generates a noise reduction signal for an ANR driver in response to an ANR microphone;
    a first input for receiving audio signals from the aircraft radio intercom;
    a second input for receiving audio signals from a digital music player;
    a wireless transceiver coupled to the ANR circuitry for communicating wirelessly with a mobile telephone;
    comparison circuitry within the headset system that compares an intercom output signal from the aircraft radio intercom to a threshold;
    decoupling circuitry that electrically decouples the intercom output signal from an input signal path of the ANR circuitry; and
    attenuating circuitry coupled to the first input and the second input that selectively attenuates audio signals from the second input when the first input is receiving audio signals from the aircraft radio intercom that exceed the threshold as determined by the comparison circuitry.

2. The ANR headset system of claim 1, wherein the comparison circuitry and the decoupling circuitry are disposed within a battery box of the ANR headset system.

3. The ANR headset system of claim 1, further comprising: circuitry that prevents selectively attenuating mobile telephone signals.

4. The ANR headset system of claim 1 wherein the attenuating circuitry selectively mutes the audio signals from the second input in response to a signal from the comparison circuitry.

5. The ANR headset system of claim 1 wherein the wireless transceiver comprises a Bluetooth wireless transceiver.

6. The ANR headset system of claim 1 wherein the attenuating circuitry selectively attenuates audio signals from the first input when the audio signals from the aircraft radio intercom are below the threshold as determined by the comparison circuitry.

7. The ANR headset system of claim 1 further comprising a differential amplifier connected to at least one of the first input and second input.

8. The ANR headset system of claim 1 further comprising:
a voice microphone electrically connected to bias circuitry to power the voice microphone, the voice microphone providing audio signals to the wireless transceiver when communicating with a mobile telephone.

9. The ANR headset system of claim 8 wherein the bias circuitry provides power to the voice microphone independent of whether an audio signal is present at one of the first and second inputs.

10. The ANR headset system of claim 1 wherein the ANR driver is coupled to the first input and the second input and generates an output in response to audio signals received from at least one of the first and second inputs.

* * * * *